US012478063B2

(12) United States Patent
Pérez Larios

(10) Patent No.: US 12,478,063 B2
(45) Date of Patent: Nov. 25, 2025

(54) NANOSYSTEMS BASED ON NANOCOMPOSITES AND NATURAL EXTRACTS

(71) Applicant: Javier Eduardo López Macías, Mexico City (MX)

(72) Inventor: Alejandro Pérez Larios, Colonia las Hadas (MX)

(73) Assignee: Javier Eduardo López Macías, Mexico City (MX)

( * ) Notice: Subject to any disclaimer, the term of this patent is extended or adjusted under 35 U.S.C. 154(b) by 0 days.

(21) Appl. No.: 18/257,539

(22) PCT Filed: Dec. 14, 2020

(86) PCT No.: PCT/IB2020/061916
§ 371 (c)(1),
(2) Date: Jun. 14, 2023

(87) PCT Pub. No.: WO2022/129983
PCT Pub. Date: Jun. 23, 2022

(65) Prior Publication Data

US 2024/0041027 A1 Feb. 8, 2024

(51) Int. Cl.
*A01N 25/08* (2006.01)
*A01N 27/00* (2006.01)
(Continued)

(52) U.S. Cl.
CPC ............. *A01N 25/08* (2013.01); *A01N 27/00* (2013.01); *A01N 31/02* (2013.01); *A01N 31/08* (2013.01); *A01N 31/14* (2013.01); *A01N 35/02* (2013.01); *A01N 35/04* (2013.01); *A01N 35/06* (2013.01); *A01N 37/06* (2013.01); *A01N 65/08* (2013.01); *A01N 65/10* (2013.01); *A01N 65/12* (2013.01); *A01N 65/22* (2013.01); *A01N 65/24* (2013.01); *A01N 65/28* (2013.01); *A01N 65/34* (2013.01); *A01N 65/36* (2013.01); *A01N 65/38* (2013.01); *A01N 65/44* (2013.01); *A01N 65/48* (2013.01); *A01P 1/00* (2021.08); *A01P 3/00* (2021.08); *A61K 31/01* (2013.01); *A61K 31/015* (2013.01); *A61K 31/045* (2013.01); *A61K 31/05* (2013.01); *A61K 31/085* (2013.01); *A61K 31/11* (2013.01); *A61K 31/121* (2013.01); *A61K 31/122* (2013.01); *A61K 31/231* (2013.01); *A61K 36/14* (2013.01); *A61K 36/15* (2013.01); *A61K 36/185* (2013.01); *A61K 36/21* (2013.01); *A61K 36/232* (2013.01); *A61K 36/235* (2013.01);
(Continued)

(58) Field of Classification Search
CPC ........ A01N 25/08; A01N 27/00; A01N 31/02; A01N 31/08; A01N 31/14; A01N 35/02; A01N 35/04; A01N 35/06; A01N 37/06; A01N 65/08; A01N 65/10; A01N 65/12; A01N 65/22; A01N 65/24; A01N 65/28; A01N 65/34; A01N 65/36; A01N 65/38; A01N 65/44; A01N 65/48; A01N 59/16; A01P 1/00; A01P 3/00; A01P 15/00; A61K 31/01; A61K 31/015; A61K 31/045; A61K 31/05; A61K 31/085; A61K 31/11; A61K 31/121; A61K 31/122; A61K 31/231; A61K 36/14; A61K 36/15; A61K 36/185; A61K 36/21; A61K 36/232; A61K 36/235; A61K 36/24; A61K 36/268; A61K 36/28; A61K 36/282; A61K 36/288; A61K 36/30; A61K 36/31; A61K 36/35; A61K 36/484; A61K 36/52; A61K 36/53; A61K 36/534; A61K 36/537; A61K 36/54; A61K 36/61; A61K 36/63; A61K 36/66; A61K 36/67; A61K 36/68; A61K 36/738; A61K 36/746; A61K 36/75; A61K 36/752; A61K 36/81; A61K 36/85; A61K 36/87; A61K 36/886; A61K 36/899; A61K 36/9062; A61K 36/9066; A61K 36/9068; A61P 31/04; A61P 31/06; A61P 31/10; A61P 31/12
See application file for complete search history.

(56) References Cited

U.S. PATENT DOCUMENTS

2010/0172993 A1* 7/2010 Singh ...................... A61K 9/19
564/387
2016/0143981 A1* 5/2016 Gutiérrez ................ C09D 7/61
424/617

OTHER PUBLICATIONS

Khan, M. A.; Wallace, W. T.; Islam, S. Z.; Nagpure, S.; Strzalka, J. Littleton, J. M.; Rankin, S. E.; Knutson, B.L. Adsorption and Recovery of Polyphenolic Flavonoids Using TiO2-Functionalized Mesoporous Silica Nanoparticles. Appl. Mater. Interfaces, 9, 32114-32125, (Year: 2017).*

(Continued)

*Primary Examiner* — Jessica Worsham
(74) *Attorney, Agent, or Firm* — Leber IP Law

(57) ABSTRACT

The instant invention refers to nanosystems comprising nanocomposites for adsorption or support of natural extracts; a process for the preparation thereof; formulations containing thereof, as well as a nanomaterial that adsorbs one or more essential oils in its surface. Specially, one object of the invention is the encapsulation of natural extracts, i.e., essential oils and/or natural pure bioactive compounds and optionally terpenoid, sesquiterpenoid, diterpenoid, sesterterpenoid, triterpenoid, carotenoid, and ricinoid compounds; complementary acids, and polysaccharides; vitamins, and other organic compounds, in mesoporous materials for application in different industries such as food, agricultural, veterinary, aquacultural, pharmaceutical, cosmetic, cleaning, sanitizing, and disinfection industries, as well as in medicine.

13 Claims, 7 Drawing Sheets

(51) Int. Cl.

*A01N 31/02* (2006.01)
*A01N 31/08* (2006.01)
*A01N 31/14* (2006.01)
*A01N 35/02* (2006.01)
*A01N 35/04* (2006.01)
*A01N 35/06* (2006.01)
*A01N 37/06* (2006.01)
*A01N 65/08* (2009.01)
*A01N 65/10* (2009.01)
*A01N 65/12* (2009.01)
*A01N 65/22* (2009.01)
*A01N 65/24* (2009.01)
*A01N 65/28* (2009.01)
*A01N 65/34* (2009.01)
*A01N 65/36* (2009.01)
*A01N 65/38* (2009.01)
*A01N 65/44* (2009.01)
*A01N 65/48* (2009.01)
*A01P 1/00* (2006.01)
*A01P 3/00* (2006.01)
*A61K 31/01* (2006.01)
*A61K 31/015* (2006.01)
*A61K 31/045* (2006.01)
*A61K 31/05* (2006.01)
*A61K 31/085* (2006.01)
*A61K 31/11* (2006.01)
*A61K 31/121* (2006.01)
*A61K 31/122* (2006.01)
*A61K 31/231* (2006.01)
*A61K 36/14* (2006.01)
*A61K 36/15* (2006.01)
*A61K 36/185* (2006.01)
*A61K 36/21* (2006.01)
*A61K 36/232* (2006.01)
*A61K 36/235* (2006.01)
*A61K 36/24* (2006.01)
*A61K 36/268* (2006.01)
*A61K 36/28* (2006.01)
*A61K 36/282* (2006.01)
*A61K 36/288* (2006.01)
*A61K 36/30* (2006.01)
*A61K 36/31* (2006.01)
*A61K 36/35* (2006.01)
*A61K 36/484* (2006.01)
*A61K 36/52* (2006.01)
*A61K 36/53* (2006.01)
*A61K 36/534* (2006.01)
*A61K 36/537* (2006.01)
*A61K 36/54* (2006.01)
*A61K 36/61* (2006.01)
*A61K 36/63* (2006.01)
*A61K 36/66* (2006.01)
*A61K 36/67* (2006.01)
*A61K 36/68* (2006.01)
*A61K 36/738* (2006.01)
*A61K 36/746* (2006.01)
*A61K 36/75* (2006.01)
*A61K 36/752* (2006.01)
*A61K 36/81* (2006.01)
*A61K 36/85* (2006.01)
*A61K 36/87* (2006.01)
*A61K 36/886* (2006.01)
*A61K 36/899* (2006.01)
*A61K 36/9062* (2006.01)
*A61K 36/9066* (2006.01)
*A61K 36/9068* (2006.01)
*A61P 31/04* (2006.01)
*A61P 31/06* (2006.01)
*A61P 31/10* (2006.01)
*A61P 31/12* (2006.01)

(52) U.S. Cl.

CPC ............ *A61K 36/24* (2013.01); *A61K 36/268* (2013.01); *A61K 36/28* (2013.01); *A61K 36/282* (2013.01); *A61K 36/288* (2013.01); *A61K 36/30* (2013.01); *A61K 36/31* (2013.01); *A61K 36/35* (2013.01); *A61K 36/484* (2013.01); *A61K 36/52* (2013.01); *A61K 36/53* (2013.01); *A61K 36/534* (2013.01); *A61K 36/537* (2013.01); *A61K 36/54* (2013.01); *A61K 36/61* (2013.01); *A61K 36/63* (2013.01); *A61K 36/66* (2013.01); *A61K 36/67* (2013.01); *A61K 36/68* (2013.01); *A61K 36/738* (2013.01); *A61K 36/746* (2013.01); *A61K 36/75* (2013.01); *A61K 36/752* (2013.01); *A61K 36/81* (2013.01); *A61K 36/85* (2013.01); *A61K 36/87* (2013.01); *A61K 36/886* (2013.01); *A61K 36/899* (2013.01); *A61K 36/9062* (2013.01); *A61K 36/9066* (2013.01); *A61K 36/9068* (2013.01); *A61P 31/04* (2018.01); *A61P 31/06* (2018.01); *A61P 31/10* (2018.01); *A61P 31/12* (2018.01)

(56) References Cited

OTHER PUBLICATIONS

Sobel, Ashley. What is limonene? Everything you need to know. Healthline. (Year: 2019).*

International Application No. PCT/IB2020/061916, International Search Report and Written Opinion dated Apr. 30, 2021, 20 pages.

Khan; et al., "Adsorption and Recovery of Polyphenolic Flavonoids Using TiO2 Functionalized Mesoporous Silica Nanoparticles", American Chemical Association, Applied Material Interfaces, Aug. 21, 2017, vol. 9, 19 pages.

Roca; et al., "Exopolysaccharides enriched in rare sugars: bacterial sources, production, and applications", Frontiers in Microbiology, Apr. 10, 2015, vol. 6, 7 pages.

Wikipedia [online], "Mesoporous material", Jul. 12, 2019, [retrieved on Sep. 14, 2023], retrieved from <https://en.wikipedia.org/w/index.php?title= Mesoporous_material&oldid=905992070>, 3 pages.

Wikipedia [online], "Cinnamomum verum", Nov. 7, 2019, [retrieved on Sep. 14, 2023] retrieved from <https://en.wikipedia.org/w/index.php?title=Cinnamomum_verum&oldid=925066251>, 4 pages.

Wikipedia [online], "Orange Oil", Nov. 21, 2018 [retrieved on Sep. 14, 2023], retrieved from <https://en.wikipedia.org/wiki/Orange_oil>, 4 pages.

Wikipedia [online], "Grapefruit", Sep. 30, 2019, [retrieved on Sep. 14, 2023], retrieved from <https://en.wikipedia.org/w/index.php?title=Grapefruit&oldid=918833223>, 11 pages.

Scentcillo [online], "Neroli (*Citrus aurantium* var. *amara*) essential oil—relaxing blossom scent of Spring", Sep. 1, 2015, [retrieved Sep. 14, 2023], retrieved from <https://www.scentcillo.com/blog/neroli-citrus-aurantium-var-amara-essential-oil-relaxing-blossom-scent-spring>, 13 pages.

Wikipedia [online], "Coriander", Oct. 31, 2019, [retrieved Sep. 14, 2023], retrieved from <https://en.wikipedia.org/w/index.php?title=Coriander&oldid=923881357>, 8 pages.

WebMD [online], "Rutin—Uses, Side Effects, and More", Aug. 9, 2019, [retrieved Apr. 9, 2024] retrieved from <https://www.webmd.com/vitamins/ai/ingredientmono-270/rutin>, 4 pages.

WebMD [online], "Quercetin", Mar. 10, 2019, [retrieved Apr. 9, 2024], retrieved from <https://www.webmd.com/vitamins-and-supplements/quercetin-uses-and-risks>, 3 pages.

(56) References Cited

OTHER PUBLICATIONS

EPA [online], "Why We Use Pesticides", Jun. 5, 2018, [retrieved Apr. 9, 2024], retrieved from <https://www.epa.gov/safepestcontrol/why-we-use-pesticides>, 4 pages.

Wikipedia [online], "Antimicrobial", Nov. 4, 2019, [retrieved Apr. 9, 2024], retrieved from <https://en.wikipedia.org/w/index.php?title=Antimicrobial&oldid=924514442>, 8 pages.

Wikipedia [online], "Anthelminitic", Nov. 1, 2019, [retrieved Apr. 9, 2024], retrieved from <https://en.wikipedia.org/wiki/Anthelmintic>, 4 pages.

Wikipedia [online], "Capsicum annuum", Oct. 19, 2019, [retrieved Apr. 9, 2024], retrieved from <https://en.wikipedia.org/wiki/Capsicum_annuum>, 10 pages.

Wikipedia [online], "Quercetin", Nov. 20, 2019, [retrieved Apr. 9, 2024], retrieved from <https://en.wikipedia.org/w/index.php?title=Quercetin&oldid=927194986>, 8 pages.

Sotomayer; et al., "Characterization of Micro/Mesoporous Materials by Physisorption: Concepts and Case Studies", Accounts of Material & Surface Research vol. 3, No. 2, Apr. 2018, 17 pages.

Li; et al., "Strategies to Obtain Encapsulation and Controlled Release of Small Hydrophilic Molecules", Frontiers in Bioengineering and Biotechnology, vol. 8, Article 434, May 13, 2020, 6 pages.

Xu; et al., Mechanism of Photodegradation of Organic Pollutants in Seawater by TiO2-Based Photocatalysts and Improvement in Their Performance, ACS Omega, vol. 6, Nov. 5, 2021, 10 pages.

Ghaedi; et al., "Review on Template Removal Techniques for Synthesis of Mesoporous Silica Materials", Energy Fuels, vol. 36, Feb. 19, 2022, 23 pages.

Schneider; et al., "Understanding TiO2 Photocatalysis: Mechanisms and Materials", Chemical Reviews, vol. 114, Sep. 19, 2014, 68 pages.

Sakar; et al., "Insights into the TiO2-Based Photocatalytic Systems and Their Mechanisms", Catalysts, vol. 9, Aug. 9, 2019, 32 pages.

Besharat, "Adsorpotion of Molecular thin films on metal and metal oxide surfaces", Doctoral Thesis in physics School of Information and Communication Technology KTH Royal Institute of Technology, Dec. 9, 2016, 93 pages.

Salager, Jean Louis, " Adsorption Wettability", Formulation Laboratory, Interfaces, Rheology and Process (FIRP) S160A Notebook, Teaching Module, 1998, 15 pages.

Sing et al., "Reporting Physisorption Data for Gas/Solid Systems with Special reference to the Determination of Surface Area and Porosity", Pure & Applied Chemistry, vol. 57, No. 4, IUPAC, 1985, 17 pages.

Ayodele et al., "Oligosaccharide Lactate Nanoparticles Enhance Tissue Targeting: A Case Study of the Controlled Delivery of Bedaquiline to Cardiac Tissue in TB Pericarditis", Molecules 2025, vol. 30, No. 2845, Jul. 3, 2025, 22 pages.

Fuertes, et al., "Sorption Properties of Mesoporous Multilayer Thin Films", The Journal of physical Chemistry, Letters, vol. 112, Feb. 13, 2008, 7 pages.

Aranovich, et al., "A New Approach to Analysis of Multilayer Adsorption", Journal of Colloid and Interface Science, vol. 173, Jan. 18, 1995, 6 pages.

* cited by examiner

Figure 5a
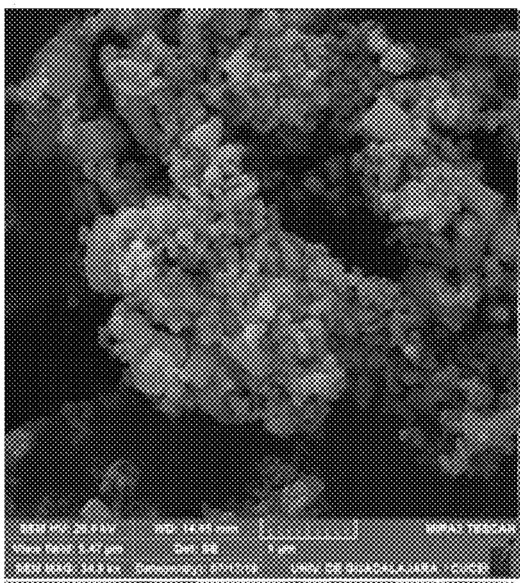
Figure 5b
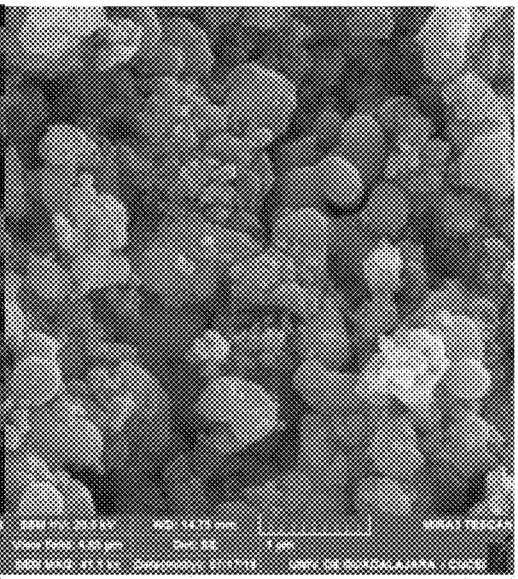
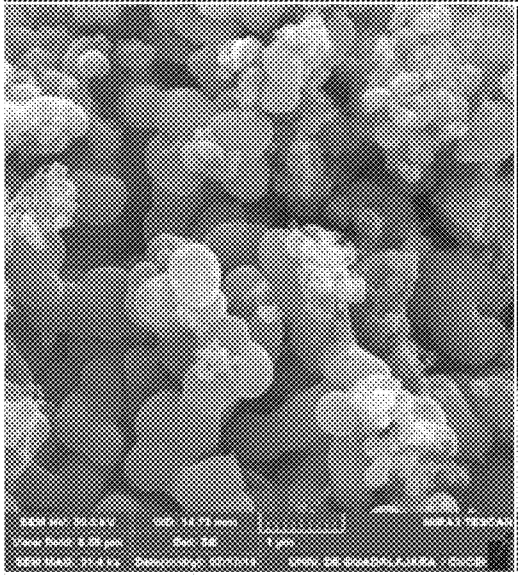
Figure 5c
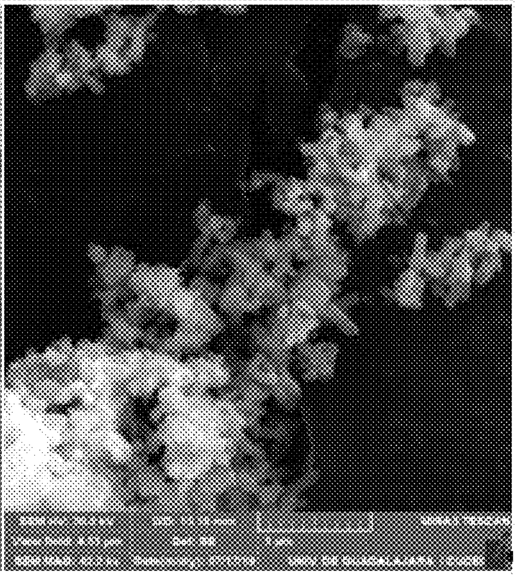
Figure 5d

Figure 6a
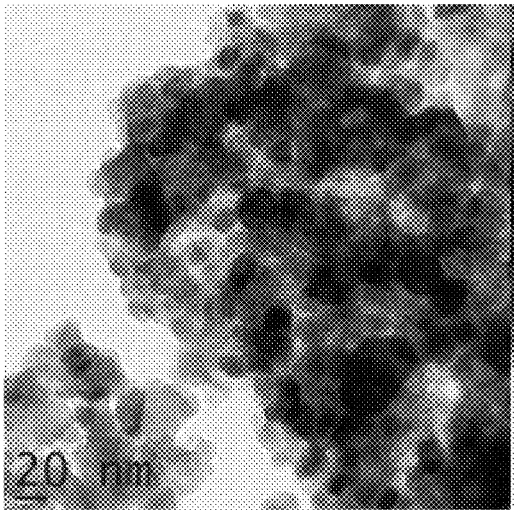
Figure 6b
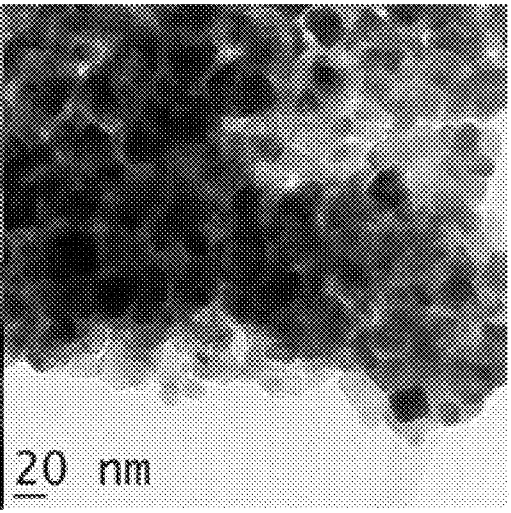
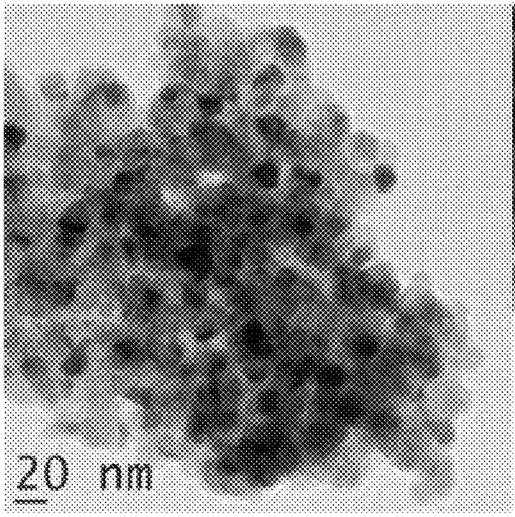
Figure 6c
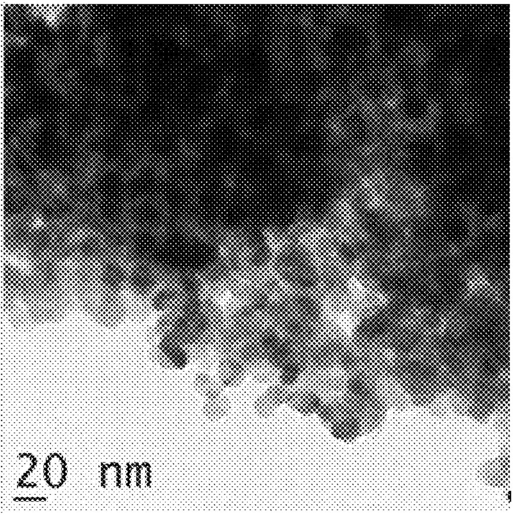
Figure 6d

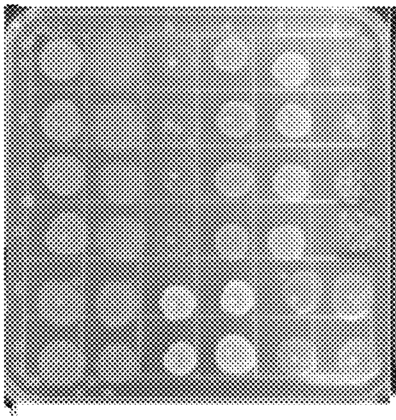
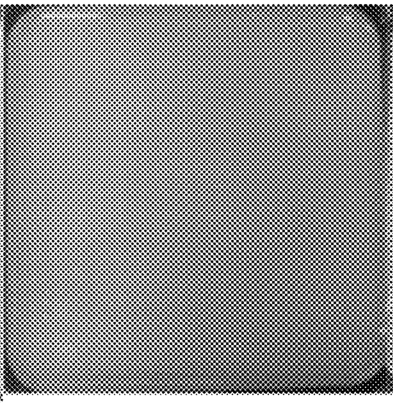
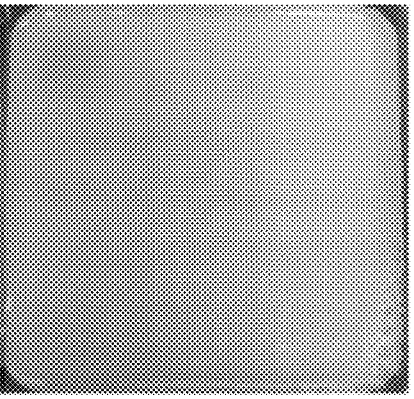
Figure 7a Figure 7b Figure 7c
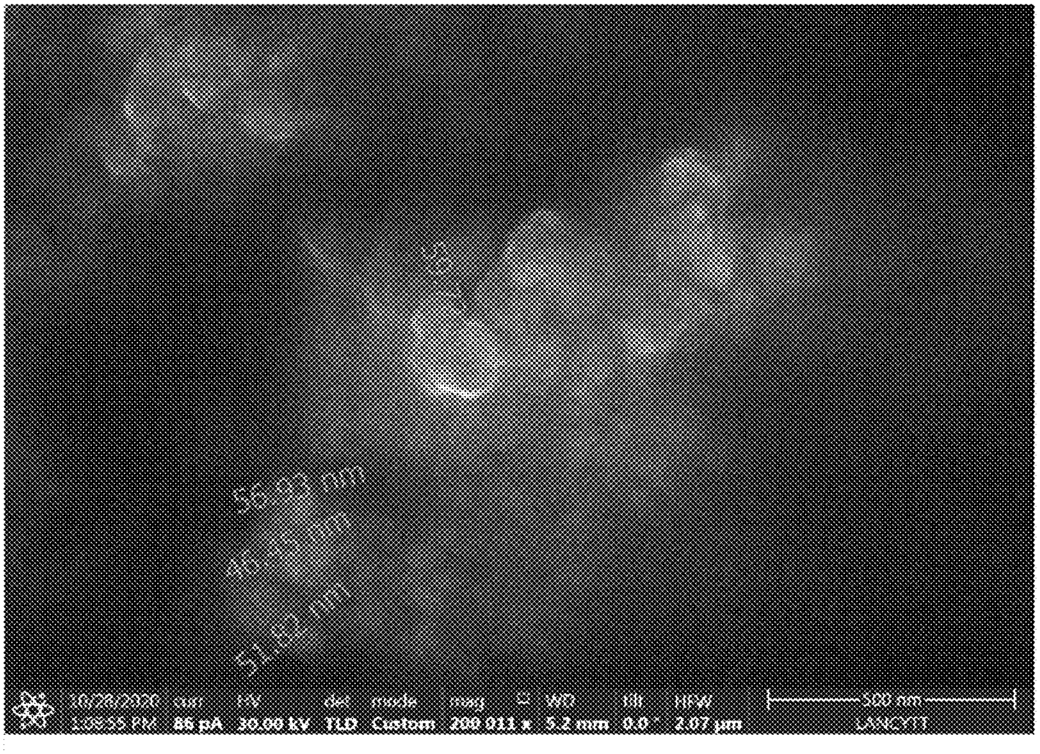
Figure 8

NANOSYSTEMS BASED ON NANOCOMPOSITES AND NATURAL EXTRACTS

RELATED APPLICATIONS

This application is a national phase entry of International Patent Application No. PCT/162020/061916, filed Dec. 14, 2020, the entire disclosure of which is incorporated herein by reference.

FIELD OF THE INVENTION

The instant invention refers to nanosystems comprising nanocomposites or titanium dioxide ($TiO_2$)-MO mixed oxides, wherein M is a transition metal combined with one or more natural extracts and optionally added with terpenoids, sesquiterpenoids, diterpenoids, sesterpenoids, triterpenoids, carotenoids, resinoids, complementary acids and polysaccharides, vitamins and other organic compounds, for encapsulation of natural products; a process for the preparation thereof; formulations that contain the same; and uses thereof as well as a titanium dioxide-based nanosystem combined with one or more natural extracts and optionally added with terpenoids, sesquiterpenoids, diterpenoids, sesterpenoids, triterpenoids, carotenoids, resinoids, complementary acids and polysaccharides, vitamins and other organic compounds. Specially, one object of the invention is a nanosystem with encapsulation of natural extracts which may have a concentration ranging from about 10 mg to about 100 mg, wherein said natural extracts may be, for example, natural essential oils and/or natural pure bioactive compounds. The nanosystems have application in different industries such as food, agricultural, veterinary, aquaculture, pharmaceutical, cosmetic, cleaning, sanitizing, and disinfection industries, as well as in medicine.

BACKGROUND OF THE INVENTION

Porous materials have a great importance in the industry, forming a fundamental sector within the science of materials. They are present in diverse industrial processes as adsorbent agents, support for catalysts, molecular sieves, filtration membranes, aerogels, foams, etc. The interest of these materials resides on their porous structure, which gives them a high porosity volume and specific area (Ishizaki, Komarneni and Nanko. "Porous Materials Process technology and application". 1998). Nanocomposites or mixed oxides have been studied in many applications, e.g., zinc oxide (ZnO) and titanium dioxide ($TiO_2$) have been used as sunscreens.

Titanium dioxide ($TiO_2$) is a natural mineral product found in three crystalline forms: anatase (octahedral structure), rutile (tetragonal structure), and brookite (orthorhombic structure), wherein anatase and rutile structures are the most common. Anatase is the most active allotropic form. Also, $TiO_2$ is chemically inert, its specific area is very low (30-50 $m^2/g$) which decreases significantly at high temperatures because of a phase transformation and crystal growing. This material is very useful because of its dispersion properties, chemical and biological stability—although heat instability is known—, non toxicity, low cost, and capability to function within a wide range of pH. To improve its heat stability, the synthesis of mixed oxides may be an alternative.

Titanium dioxide is a white solid inorganic substance. $TiO_2$ is sparingly soluble in water, non-flammable, heat stable, and it is not classified as dangerous according to FDA and the United Nations (UN) Globally Harmonized System (GHS) of Classification and Labelling of Chemicals. Titanium dioxide nanoparticles ($TiO_2$ NP) constitute one of the most important materials for cosmetics, pharmaceutical products, skin care products, and it is also used in paints, plastics, paper, inks, food colorants, and dentifrices.

On the other hand, several techniques for the synthesis of $TiO_2$ NP are well known; e.g., Langmuir-Blodgett film, sol-gel process, dip coating, liquid phase deposition, chemical bath deposition, chemical vapor deposition (CVD), spray pyrolysis deposition, magnetism.

ZnO is an inorganic compound with three crystalline structures: wurtzite form, zincblende form and the rocksalt form, from which the thermodynamically stable phase under normal pressure and temperature conditions is wurtzite. The future of zinc oxide undoubtedly is fascinating because of potential progresses in medical applications.

The individual use of $TiO_2$ and ZnO as inorganic antimicrobial agents is known and thus the interest about them has increased when combined; i.e., as nanocomposites or mixed metal oxides. For example, in "Synthesis and antibacterial activity of $TiO_2$/ZnO nanocomposites prepared via nonhydrolytic route"; A. Stoyanova, et al., (Journal of Chemical Technology and Metallurgy, 48, 2, 2013, 154-161), their application as nanoparticles of metal oxides is already mentioned because of their electronic and chemical properties. In this article is also mentioned that the synthetic route has influence on the surface properties and particle size of the products; so, the authors considered necessary to direct their investigations to the application of the non hydrolytic sol-gel process to obtain other compositions of Ti—Zn, where the result was an article referred to the synthesis of $TiO_2$/ZnO nanocomposite powder. However, the article does not go beyond of that study, which limits it precisely to the mentioned synthesis.

Plant extracts are considered as a complex matrix obtained from a plant that may may or not may contain residual solvent. There is a vast set of techniques suitable for the extraction of plant components involving different parts of the plant and main targeted compounds; for example, the extraction methods mentioned in Chapter 5 of Noelia Lopez Giral, "Obtención y Aplicación de Extractos Naturales", Centro Nacional de Tecnologia y Seguridad Alimentaria—Laboratorio del EBRO, 21 de junio del 2011. Depending on the technique and protocol, the extraction might favor a given group of secondary metabolites over another. During fractioning of the extract the elimination of undesirable compounds may occur; however, in the case of nanosystems, extracts associated to said complex matrix nanosystems should be considered (i.e., two or more compounds). In this way, depending on the lipophilicity and the nanostructure selection, the extract compounds may be basically found in three different places: (i) solubilized in the external aqueous phase; (ii) adsorbed onto the carrier's surface; and (iii) entrapped inside the carrier (Giovanni Konat Zorzi, et al. "On the use of nanotechnology-based strategies for association of complex matrices from plant extracts." Revista Brasileira de Farmacognosia 25 (2015) 426-436).

Natural products represent a large family of diverse chemical entities produced naturally by any organism with a wide variety of biological activities and distinctive pharmacological effects. They originate from bacterial, fungal, plant, and marine animal sources [Katz, L.; Balt, RH. Natural product discovery: Past, present, and future. J. Ind. Microbiol. Biotechnol. 2016, 43, 155-176].

Today, there is an ever-growing interest on natural food ingredients, in agriculture, pharmaceutical and cosmetic industries, and they are often used as aromatics, beverages, repellents, fragrances, and also in medicinal products. For example, people now are looking for those products in the market which are free from artificial and synthetic additives, and that may improve their health. These bioactive ingredients should be formulated to be protected against harsh process and environmental conditions, and to be delivered securely to the target organs and cells. Nanoencapsulation is a perfect strategy for this situation and there have been many studies in the last years about nanoencapsulation of components by means of several technologies. It is necessary to have a general vision of the nanoencapsulation techniques applicable to these ingredients in a systematic classification; i.e., lipid-based nanocarriers, nature-inspired nanocarriers, special-equipment-based nanocarriers, biopolymer nanocarriers, and other nanocarriers. Assadpour, Elham, and Seid Mandi Jafari. “A systematic review on nanoencapsulation of food bioactive ingredients and nutraceuticals by various nanocarriers.” Critical reviews in food science and nutrition vol. 59, 19 (2019): 3129-3151. doi: 10.1080/10408398.2018.1484687.

Encapsulation is a technique in which active agents are trapped in a biodegradable matrix or “wall” material forming micro/nano-systems. Encapsulation of bioactive natural compounds is widely used in the food, agricultural, pharmaceutical, and cosmetic industries, and it has demonstrated to be a very useful method for: (1) the protection of unstable bioactive compounds against severe processing conditions (for example, high temperature, oxygen); (2) the protection of volatile compounds such as essential oils; (3) the construction of specific delivery systems and the controlled release of the encapsulated compound; (4) an easier management because of the modified physical characteristics of the material within the original core (to change a liquid by a solid); (5) the masking of unpleasant flavors and odors from certain active compounds, which improves their acceptance; (6) the increment of water solubility, etc. [Nedovic, V.; Kalusevic, et al., “An overview of encapsulation technologies so for food applications”; Munin, A. et al., “Encapsulation of Natural Polyphenolic Compounds”].

Nanoencapsulation may be achieved by means of two main approaches: top-down and bottom-up. Bottom-up methods include the emulsification, and emulsification-solvent evaporation, while top-down methods include techniques of supercritical fluid, inclusion complexation (i.e., crystalline mixture in which the molecules of one component are contained within the crystalline network of the other one), coacervation, and nanoprecipitation. However, a combination of both of the approaches is often used.

There is a vast literature about microencapsulation techniques such as Jafari, S. M. “An overview of nanoencapsulation techniques and their classification”; Suganya, V. et al.; “Microencapsulation and Nanoencapsulation”; Jyothi, N. V. et al. “Microencapsulation techniques, factors influencing encapsulation efficiency.”; however, in most of them it is recognized that no process is unique or standard for all basic materials or product applications because there are many different factors involved and to consider, in order to select the optimal method. Nevertheless, spray-drying, ionic gelation, emulsification, and coacervation methods or techniques, either simple or complex, are the most useful according to Jyothi, N. V. et al. “Microencapsulation techniques, factors influencing encapsulation efficiency.”

Powder drying methods or techniques are well explained by Gibbs, B. F. et al. “Encapsulation in the food industry”; Assadpour, E. et al. “Advances in Spray-Drying Encapsulation of Food Bioactive Ingredients”; ionic gelation method by Das, S. et al. “Encapsulation in chitosan-based nanomatrix as an efficient green technology to boost the antimicrobial, antioxidant and in situ efficacy of *Coriandrum sativum* essential oil.”; Shetta, A. et al. “Comparative study of encapsulated peppermint and green tea essential oils in chitosan nanoparticles”, and Feyzioglu, G. C. et al. “Development of chitosan nanoparticles loaded with summer savory (Saturejahortensis L.) essential oil for antimicrobial and antioxidant delivery applications.”; and emulsification process by Lohith Kumar et al. “Encapsulation of bioactive compounds using nanoemulsions.”, and thus as these are not object matters to be claimed in the instant invention, it is not necessary to describe them; however, they should be considered as part of the present specification.

Recently, Kumar et al. reviewed the encapsulation of bioactive compounds by using nanoemulsions designed for applications of food processing. Coacervation process is one of the oldest encapsulation techniques and very useful in food, cosmetic, and pesticide industries [Bakry, A. M.; et al., “A Comprehensive Review of Benefits, Techniques, and Applications. *Compr. Rev. Food Sci. Food Saf.* 2016, 15, 143-182]. Depending on the number of polymers involved, it may be classified as a simple or complex technique; however, this last one is the preferred classification in the pharmaceutical and food fields. This method is based on the separation of two liquid phases in a coloidal solution. It is used to encapsulate heat-sensitive ingredients but constitutes a costly procedure requiring the use of toxic agents while complex coacervates are unstable [Jafari, S. M. “An overview of nanoencapsulation techniques and their classification”. In *Nanoencapsulation Technologies for the Food and Nutraceutical Industries*; Academic Press: Cambridge, MA, USA, 2017; pp. 1-34.”).

Choosing the suitable matrix material for the intended application is of great importance as this affects the encapsulation efficiency (EE) and the stability of the formed nanostructures as well as the release profile of the encapsulated molecule [Casanova, F.; Santos, L. “Encapsulation of cosmetic active ingredients for topical application”—A review. *J. Microencapsul.* 2016, 33, 1-179]. Natural macromolecules such as polysaccharides, oligosaccharides, proteins, synthetic polymers and lipids, have been applied as matrices for the encapsulation of a variety of natural and synthetic molecules.

From a marketing and clinical perspective, nanoencapsulation may protect pharmaceutical products by extending both the shelf life and biological half-life (for example, on shelf).

The term “functionalization” refers to the modification of the surface of material by bringing physical, chemical or biological characteristics different from the ones originally found on the surface of said material. Functionalization processes are intended to introduce desired functional groups into the surface of material based on chemical reactions that later share in further organic reactions and thus form functionalized materials. Said modifications allow altering the essential characteristics of the surface such as roughness, hydrophilicity, surface charge, surface energy, biocompatibility and reactivity (Afshari y Shaabani, 2018).

Coupling of material science with chemical transformations for the synthesis of functionalized materials is a growing interdisciplinary field that is why the functionalization of nanomaterials has had a growing interest due to its wide application field (biology, nanobiotechnology, diagnostics, nanoanalytics, and pharmaceutic).

Surface functionalization may be carried out by different strategies: the ligand exchange method, introduction of functional thiol groups, the use of different types of coatings with different agents through synthesis in mixtures and reactions derived from a predecessor in post-synthesis.

The post-synthesis allows modifying the surface of the purified and monodispersed nanoparticles (NPs) and then new features or new molecules or drugs are introduced on the NPs ligands. Post-synthesis may be made through four main methods: covalent attachment, electrostatic interaction, direct thiol reactions and secondary interaction; all of which may be carried out with biomolecules (Maccora et al., 2019).

Thus, the interaction of molecules on the surface will have an effect on functionalization. This involves the presence of chemical fractions of reagents on the homofunctional or heterofunctional surface depending on whether there is a chemical group on the surface or several groups coexist thereon.

Due to their composition and structure, the surface might not allow different types of interactions. Thus, it is not only necessary to consider the concentration or size of NPs, but also the species and quantity of chemical products interacting between the NPs. There is a wide-open variety of biomolecules capable to interact onto the nanoparticles surface through the existent coating on said NPs. This coating is directly related to the physicochemical conditions of the NPs and structure of biomolecules (Aur et al. 2019).

Accordingly, the continuous development of biocompatible nanomaterials such as nanocomposites or mixed metal oxides contributes to the potential versatility of nanostructures by allowing the provision of compounds with solubility limitations. In addition, the manipulation of synthesis or stratification protocols may generate nanostructures with properties adapted to highly specific applications; for example, injectable nanoparticles or nanofibers for wound dressings [Gunn, J. et al. "Polyblend nanofibers for biomedical applications: Perspectives and challenges. *Trends Biotechnol.* 2010, 28, 189-197; Vasita, R. et al. "Nanofibers and their applications in tissue engineering. *Int. J. Nanomed.* 2006, 1, 15-30; Guo, G. et al. "Preparation of curcumin loaded poly(epsilon-caprolactone)-poly(ethylene glycol)-poly(epsilon-caprolactone) nanofibers and their in vitro antitumor activity against glioma 91 cells." *Nanoscale* 2011, 3, 3825-3832; Yoo, J. J. et al. "5-aminolevulinic acid-incorporated poly(vinyl alcohol) nanofiber-coated metal stent for application in photodynamic therapy. *Int. J. Nanomed.* 2012, 7, 1997-2005].

As stated above, there is a vast number of literature, some of them included in the Bibliography chapter of the instant specification, that involve the use of nanocomposites or mixed metal oxides, e.g., $TiO_2$ and ZnO (alone or combined), and natural extracts, having different applications in various industries; however, as previously mentioned, in most of said applications it is recognized that no process is unique or standard for all materials or applications because of the many different factors involved in the selection of the optimal manufacturing method, as well as different disadvantages.

For example, Mexican patent No. 339086 relates to a compounded nanomaterial that comprises, according to the specification and claims, a titanium dioxide support having a surface area greater than or equal to 50 $m^2/g$, and a mean diameter size between the range of 1 and 100 nm, and first functional groups including, for example, hydroxyl, phosphate, sulfate, chloride, amino, and second functional groups physically adsorbed on the surface and pores of said support, that comprise herbal extracts such as oregano, cinnamon, or pepper and/or fruit extracts such as grape, tangerine, orange, grapefruit, lemon, guava, and pomegranate, where the nanomaterial is used in a composition useful as a disinfectant and antiseptic. The method to obtain the nanomaterial consists in provide nanoparticles of titanium dioxide with a diameter between 1 and 100 nm and a surface area greater than or equal to 50 $m^2/g$, carry out a first chemical modification of the nanomaterial by the adsorption of first functional groups, and a second modification of the nanomaterial by the adsorption of second functional groups that comprise herbal and/or fruit extracts.

The disadvantage of said patent is the use of several acids as well as phosphates, sulfates, and chlorides, while in the instant invention, the extraction is a completely green process as it uses only one ethanolic solution and water. Furthermore, through the method of such patent the obtained product has a nanotube shape.

Mexican patent No. 369179 refers to a composition with antimicrobial activity to disinfect apples, which comprises a dry ketonic extract of calyxes of hibiscus flower, acetic acid, sodium hypochlorite, and polysorbate 80. Said patent is limited to elimination of *E. coli* and *S. typhimurium* only.

Mexican patent No. 369180 refers to a composition with antimicrobial activity to disinfect lettuces, which comprises a dried aqueous extract of calyxes of hibiscus flower, acetic acid, sodium hypochlorite, and polysorbate 80. Said patent is limited to elimination of *E. coli* and *S. typhimurium* only.

U.S. Pat. No. 8,673,331 refers to an anti-bacterial composition with excellent sterilizing power, deodorization and adhesion activity as well as the application, and preparation method thereof. Said composition which is used against bacteria, fungi, and viruses, comprises colloidal silver particles in an amount of from 11 wt % to 15 wt %, titanium dioxide particles in an amount of from 18 wt % to 25 wt %, a dispersion stabilizer in an amount of from 0.01 wt % to 10 wt %, a binder in an amount of from 0.1 wt % to 4 wt %, and a balance of water in an amount required to form 100 wt %. The process granted in this patent involves two nanoparticles, namely colloidal silver, and titanium dioxide, which are combined by homogeneously dispersing the colloidal silver in a solvent using a binder, instead of using the complicated process of mixing, hydrothermal synthesis of a complex, intermetallic substitution, and sintering.

Mexican patent application No. PA/a/2001/001599 refers to personal cleansing compositions having photoprotective agents of the inorganic type such as titanium dioxide and zinc oxide. Said application does not include natural extracts and it is not intended to eliminate bacteria, fungi, and viruses.

Mexican patent application No. MX/a/2013/008570 refers to a fungicidal and bactericidal composition comprising volatile organic compounds obtained from plants and microorganisms used to protect agricultural crops, in food preservation, and in equipment and facilities disinfection. Said application does not include or claim a nanosystem comprising a nanocomposite and natural extracts.

Mexican patent application No. MX/a/2013/009572 refers to a bactericidal or antifungal agent comprising titania, silica or titania-silica mixed oxides nanostructured with silver and a functional group.

Mexican patent application No. MX/a/2019/013046 refers to a formulation comprising a nanostructured, biocompatible biocatalytic material comprising a solid acid consisting of mixed oxides of silica-titania; supporting in its dispersed matrix: cooper, silver, gold, iron, ruthenium, palladium, zinc, manganese, iridium, and/or platinum metals, for use in the treatment of wounds and infections.

Document CN101513188 describes a bactericide which consists of tourmaline and a carrier of titanium dioxide, silicon dioxide, aluminum oxide, zeolite, zinc oxide, iron oxide, zirconium dioxide, sepiolite, porous ceramics, and active carbon, or mixtures thereof.

Document CN107337234 refers to a preparation method of zinc oxide-titanium dioxide composite that comprises to dissolve tetrabutyl titanate in absolute ethyl alcohol in the presence of an acid, subject the mixture to magnetic stirring, add diethanolamine drop-wise, add deionized water to obtain a titanium dioxide sol, and add zinc oxide powder to the titanium dioxide sol. The method described thereon is different to the one claimed in the instant invention, in addition to the disadvantage of having a very long processing time.

International patent application WO 2010/150036 describes a nanostructured material comprising silica-titania which are functionalized and partially hydroxilated having a Ti:Si range of compositions from 100:0 to 0:100, nanoparticles between 1 nm to 30 nm of coordinated platinum(II) dispersed on the surface and bonded in the net of the material.

International patent application WO 2011/045623 describes a bactericide or antimycotic agent comprising nanostructured titania, silica or mixtures of mixed oxides titania-silica with silver and a functional group.

International patent application WO 2011/045627 describes the synthesis of nanostructured inorganic materials with a general formula $MaLbBcO_2(b+c)(OH)x(PO4)y(SO4)_z$ where M is silicium, titanium or a mix of both, and L is iridium and B platinum, B+L<M, where b+c=1, and b is different of c. The particle size of the nanostructured matrix, acidity, mean pore size of the matrix, and platinum, iridium, or platinum-iridium particle size can be controlled from the synthesis. Said nanostructured materials may be used as viricides. The document suggests that the product contains an acid.

International publication No. WO 2020/202048 refers to techniques and principles used in nanotechnology for the manipulation of matter at the atomic and molecular level for various purposes such as industrial or pharmaceutical, and more particularly, it refers to various uses of the nanoparticulate compound of titanium dioxide functionalized with functional organic groups, inorganic radicals and fruit and/or herbal extracts adsorbed on its surface and pores as described in Patent MX 339086.

Threes, G. Smijis and Stanislav Pavel, "Titanium dioxide and zinc oxide nanoparticles in sunscreens: focus on their safety and effectiveness", Nanotechnology, Science and Applications, Dove Press Journal, 12 de October, 2011, concludes that the growing commercial and scientific interest in the use of nanosized $TiO_2$ and ZnO in sunscreens highlight the effectiveness and safety of NP sunscreen formulations. The paper also point out that anatase $TiO_2$ displays the highest photocatalytic activity when compared with rutile $TiO_2$ and ZnO NPs, and that coating the NPs reduces the toxic effects, especially when silica-based coatings are used. In this article, $TiO_2$ and ZnO were independently synthesized and are used as sunscreens.

Ghazal Nikaeen, et al., "Application of nanomaterials in treatment, anti-infection and detection of coronaviruses", Nanomedicine, Future Science Group, discloses recent studies on the effectiveness of nanoparticles as a diagnostic or antiviral tools against coronavirus. There is pointed out up to now, gold, silver, silver sulfide, titanium oxide, zirconium, graphene and some biopolymeric compounds have been the most applicable materials in the battle against coronavirus. However, the synthetic method of these nanomaterials is different from that of the present invention and even in said article additional research towards the administration of nanoparticles against viruses is recommended.

Different methods for the detection and characterization of $TiO_2$ and ZnO nanoparticles in sunscreen formulations are described in "Analysis of titanium dioxide and zinc oxide nanoparticles in cosmetics", Journal of Food and Drug Analysis, 23 (2015), 587-594, by Pei-Jia Lu, et al.; however, said article is silent in terms of obtaining a nanosystem like the one of the present invention.

The article entitled "Comparative absorption, distribution, and excretion of titanium dioxide and zinc oxide nanoparticles after repeated oral administration", Particle and Fiber Toxicology, 2013, by Wan-Seob Cho, et al., relates to the evaluation in terms of absorption, distribution and excretion patterns of $TiO_2$ and ZnO nanoparticles followed by their oral administration. However, how the material was synthesized is not disclosed, besides the surface areas are small when compared to those of the nanomaterials of the present invention. The unique similarity mentioned in said article with the present invention could be the morphology, since $TiO_2$ nanoparticles have spherical structures and ZnO nanoparticles have hexagonal morphology.

A. Stoyanova, et al., "Synthesis and antibacterial activity of $TiO_2$/ZnO nanocomposites prepared via nonhydrolytic route", Journal of Chemical Technology and Metallurgy, 48, 2, 2013, 154-161, discloses the synthesis of $TiO_2$/ZnO powders and their bactericidal properties. The $TiO_2$/ZnO nanocomposites were synthesized by a non-hydrolytic reaction between titanium(IV) chloride and zinc(II) salts in benzyl alcohol medium. The structure and morphology of the resulting particles were characterized by XRD, IR and SEM analysis. The antibacterial effect of those obtained composites was examined on *E. coli* bacteria (ATCC 25922) with an initial cell density of about $10^5$ colony forming units per ml. The synthesized $TiO_2$/ZnO composite powders were found to be highly effective against *E. coli*, especially in the presence of UV light. There was concluded that based on the study carried out, $TiO_2$/ZnO nanocomposites synthesized by the non-hydrolytic method can be a good inorganic antimicrobial agents. However, the variants with which the study was carried out are different from those of the present invention in addition to the inclusion of a natural extract and that the synthetic route is very long, this being a disadvantage with respect to the present invention.

Mayram Azizi-Lalabadi, et al., "Antimicrobial activity of Titanium dioxide and Zinc oxide nanoparticles supported in 4A zeolite and evaluation the morphological characteristic", Scientific Reports (2019) 9: 17439, describes the preparation of $TiO_2$ and ZnO nanomaterials supported into zeolite. In this regard, the deposition is made onto the zeolite, which by itself has a wide surface area.

In "Lemon-Fruit-Based Green Synthesis of Zinc Oxide Nanoparticles and Titanium Dioxide Nanoparticles against Soft Rot Bacterial Pathogen *Dickeya dadantii*", Biomolecules 2019, 9, 863, by Afsana Hossain, et al., it is disclosed that ZnO and $TiO_2$ nanoparticles were simply mixed by mixing the ZnO or $TiO_2$ solution with a lemon fruit extract at room temperature, which showed its antibacterial activity against *Dickeya dadantii*, which causes sweet potato stem and root rot disease that occurs in major sweet potato planting areas in China. The method for obtaining the extract is similar to that used in Mexican Patent No. 339086.

Moreover, the sintering of nanoparticles is carried out by using lemon extract, lacking data on the surface areas obtained.

Giovanni Konat Zorzi, et al., "On the use of nanotechnology-based strategies for association of complex matrices from plant extracts", Revista Brasileira de Farmacognosia 25 (2015) 426-436, corresponds to a bibliographic review of the use of nanotechnology. It discusses about the two main reasons for performing the herbal and fruit plant extraction, which are to improve stability and improve solubility.

In PhD thesis by Carlos Martin Shiva Ramayoni (Estudio de la actividad antimicrobiana de extractos naturales y ácidos orgánicos. Posible alternativa a los antibióticos promotores de crecimiento. Department de Sanitat i d'Anatomia Animals. Facultat de Veterinarària. Universitat Autònoma de Barcelona)) the different methods of plant extraction, including essential oils, their location, function, extraction and isolation, variability factors thereof such as chemotypes, influence of the vegetative cycle, influence of extrinsic factors and influence of the obtaining process, the quality control thereof, their toxicity and use, is described.

Through the results obtained herein, it will be clearly comprehensible for one skilled in the art, the novel advantages when using the nanosystem comprising a composite, for example, including but not limited, a mixed oxide, namely $TiO_2/ZnO$, with encapsulated natural extracts, being one of them the short synthesis route, another one the mixture of two oxides, making a mixed oxide as a nanocomposite, which increases the surface area of the nanomaterial (74 $m^2/g$ to 200 $m^2/g$) allowing a greater deposition of the natural extracts on the surface and pores of the nanomaterial, thus the nanomaterial will have a greater capacity to gradually release the molecules of the natural extracts. Yet another one is the extraction process of the natural extracts, since in the present application, it is carried out by ultrasound-assisted sonication for a very short time of about 30 minutes. Furthermore, the present invention addresses the need of having a biocidal formulation (i.e., viricide, antifungal, bactericide, pesticide, disinfectant, sanitizer, against all types of unicellular microorganisms, and germicide, etc.), with a high degree of efficacy, effectiveness and broad spectrum, as demonstrated in the detailed description of the invention below.

Therefore, some of the issues that the present invention solves is to obtain a broad spectrum nanosystem with a high degree of efficacy and effectiveness, wherein the extraction process of the natural extracts involves sonication that will reduce the time for obtaining the same, and improving the surface area of the composite.

It should be noted that the present invention could not fall into the prior art since this type of technology, like many others, depends on the advances in knowledge resulting from research on each particular composition, the biological activity of the extracts used in combination with the types of carriers, the synergy between them and the physicochemical characterization of the nanostructured system containing them.

SUMMARY OF THE INVENTION

In a first embodiment, the present invention relates to nanosystems comprising a mesoporous nanocomposite combined with natural extracts and optionally terpenoids, sesquiterpenoids, diterpenoids, sesterpenoids, triterpenoids, carotenoids, resinoids, complementary acids and polysaccharides, vitamins and other organic compounds may be added, deposited and/or adsorbed onto the surface of said mesoporous material, wherein the nanocomposite comprises titanium dioxide ($TiO_2$)-MO where M is a transition metal, for example, manganese, iron, cobalt, nickel, copper, zinc, silver, platinum, gold, and the natural extracts, which may be in a concentration of 10 mg to 100 mg, are essential oils and/or bioactive compounds derived from fruit peels and seeds.

The essential oils may be selected from anaetol, anisaldehyde, bomeol, carvacrol, D-carvone, I-carbon citral citronellal, geraniol, D-limonene, linalol, menthol, pinene, terpineol thymol, vanillin, alpha-ocimene, borneol, Y-cadinene, caryophyllene, citronellal, P-cymene, decyl aldehyde, farnesol, farnesal, fenchone, geraniol, geranyl acetate, germacrene, limonene, methyl, heptenone, myrcene, nerolinol, nerol, ocimene, terpinene, α-pinene, β-phelandrene, β-myrcene, γ-terpinolene, octanal, decanal, octanol, isocitronlene, camphene, trans-p-menthane, p-mentha-1(7), 8-diene, dihydromyrcenol, trans-dihydrocarvone, alpha-pinene, beta-pinene, estragole, longifolene, L-alpha-terpinol and can be used individually or two or more of them or in combination thereof.

The complementary acids may be selected from lactic acid, palmitic acid, formic acid, citric acid, oxalic acid, uric acid, ascorbic acid, malic acid, acetic acid and can be used individually or two or more of them or in combination thereof.

The complementary polysaccharides may be selected from glucose, ribose, deoxyribose, mannose, fructose, galactose, glyceraldehyde, erythrose, fucose and can be used individually or two or more of them or in combination thereof.

The vitamins may be selected from vitamin A, thiamine B1, riboflavine B2, niacinamide B3, pyrodoxin B6, cobalamin B12, vitamin D, vitamin C, vitamin E, folic acid (vitamin B9), pantothenic acid (vitamin B5 or W) and can be used individually or two or more of them or in combination thereof.

Other organic compounds may be selected from bioflavonoids, glycerin, pectins and amino acids and can be used individually or two or more of them or in combination thereof.

In a second embodiment, the present invention also relates to biocidal formulations (i.e., viricide, antifungal, bactericide, pesticide, disinfectant, sanitizer, against all types of unicellular microorganisms, and germicide, etc.), containing the nanosystem.

In a third embodiment, the invention relates to a titanium ($TiO_2$) nanosystem combined with natural extracts for use in the agricultural, veterinary, pharmaceutical, aquaculture, cosmetic, medical, cleaning, sanitizing, and disinfection industries.

In a fourth embodiment, the invention relates to a process for obtaining nanosystems comprising a mesoporous material support formed from a nanocomposite and natural extracts deposited and/or adsorbed onto the surface of said mesoporous material, comprising the following steps:

a) obtaining natural extracts by drying, grinding and sieving fruit peels and seeds and subsequently carrying out an ethanolic extraction using ultrasound-assisted extraction (sonication) (UAE);
b) preparing the nanocomposite or mixed oxides, for example $TiO_2$—ZnO by the sol-gel process, by mixing titanium (IV) butoxide, polyethylene glycol (PEG) and ethanol to obtain a solution;
c) heating the solution between 60 to 120° C. under reflux;
d) adding distilled water containing the appropriate amount of $Zn(NO_3)\cdot 6H_2O$ (zinc nitrate hexahydrate) to prepare each of the $TiO_2$ series at said percentages and mg of $TiO_2$ to obtain the materials with 1.0, 3.0, 5.0 and 10.0% by weight;

e) adding to the solution of the respective metal salt obtained, a few drops of $HNO_3$ (nitric acid), until obtaining a pH of about 3 in the solution;

f) adding to the solution, dropwise, butoxide-ethanol (with a molar ratio of 8:1 butanol/water);

g) mixing the solution under magnetic stirring until a gel is formed;

h) cooling the solution to about 0° C. and allowing it to mature at a temperature of about 4° C., and then drying the gel from step g) at a temperature of about 100° C.; and i) grinding the solid obtained from step h) so it can be calcined afterwards between 400 and 600° C. in an air atmosphere, to be ground again.

In a fifth embodiment, the invention relates to the method of the fourth embodiment where previous to the functionalization of the nanocomposite terpenoids, sesquiterpenoids, diterpenoids, sesterpenoids, triterpenoids, carotenoids, resinoids, complementary acids and polysaccharides, vitamins and other organic compounds can be optionally added.

In a sixth embodiment, the invention relates to obtaining a nanosystem composed of titanium dioxide ($TiO_2$) and one or more natural extracts using the method of the fourth embodiment described herein, comprising substituting the $TiO_2$—ZnO nanocomposite by $TiO_2$.

In a seventh embodiment, the invention aims to obtain, by the process of the fourth and sixth embodiment, nanoparticles in the form of "nano-droplets" or "nanospheres" in order to design a mesoporous substrate with an optimal surface area level of said nanoparticles to thereby obtain a nanocomposite which is able to adsorb and encapsulate essential oils inside its pores in order to obtain a greater efficacy and effectiveness of the nanosystem when applied.

Nanosystems may be formulated to be delivered topically or orally, by spray or by injection in combination with a drug. Although from the present description a skilled person in preparation of formulations could formulate the nanosystems in other possible ways alone or in combination with drugs.

BRIEF DESCRIPTION OF THE DRAWINGS

FIGS. 5*a*-5*d* show a Scanning Electron microscopy of $TiO_2$—ZnO a: 1.0% Zn, b: 3.0% Zn, c: 5.0% Zn and d: 10.0% Zn).

FIGS. 6*a*-6*d* show Transmission Electron Microscopy (TEM) of $TiO_2$—ZnO a: 1.0% Zn, b: 3.0% Zn, c: 5.0% Zn, d: 10.0% Zn.

FIGS. 7*a*-7*c* illustrate the evaluation of 7 ATCC reference strains and 2 control strains: a) in nutritive agar medium without extract; b) nutritive agar with 100% plant extract, c) nutritive agar with 50% plant extract.

FIG. 8 is a photomicrograph using scanning electron microscopy (SEM).

DETAILED DESCRIPTION OF THE INVENTION

Figure 1:
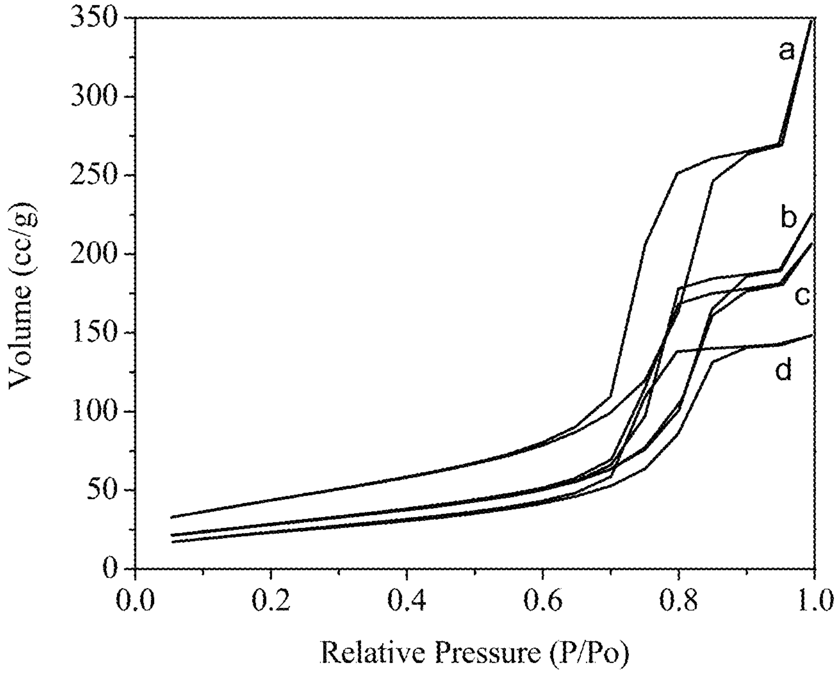
FIG. 1 illustrates the adsorption-desorption isotherms for the mixed oxides of $TiO_2$—ZnO (a: 1.0% by weight of Zn, b: 3.0% by weight of Zn, c: 5.0% by weight of Zn, d: 10.0% by weight of Zn).

The embodiments described in the present invention should in no way be construed as limiting thereof, but rather should be construed as illustrative, exemplifying the principles thereof. Any of the section titles used herein have organizational purposes only and should not be construed as limiting the subject matter disclosed.

In recent years, composites or mixed oxides have become increasingly interesting biomaterials, which constitute a new perspective in drug delivery systems and nanocarrier formulations due to their beneficial properties, including biocompatibility, biodegradability and low toxicity. The potentiality of chemical modifications of a biomaterial (mixed oxide), as well as its complementary use with other nanomaterials, attracts even more the scientific community, offering improved and combined properties in the end materials. Consequently, the present invention develops nanosystems based on a $TiO_2$ nanomaterial and/or preferably a mesoporous $TiO_2$-MO (M=Transition Metals) nanocomposite used as a matrix for the encapsulation and transport of several valuable compounds. The present invention describes as an example the use of a nanocomposite or mixed oxides based on $TiO_2$—ZnO for the production of nanosystems, without limiting the invention, focusing on the encapsulation of natural products for the encapsulation preferably of natural extracts such as essential oils and/or bioactive compounds.

In addition to essential oils, terpeneoids, sesquiterpenoids, diterpenoids, sesterpenoids, triterpenoids, carotenoids, resinoids, complementary acids and polysaccharides, vitamins and other organic compounds may be optionally added to the nanosystem.

The essential oils may be selected from anaetol, anisaldehyde, bomeol, carvacrol, D-carvone, 1-carvone citral citronellal, geraniol, D-limonene, linalol, menthol, pinene, terpineol thymol, vanillin, alpha-ocimene, borneol, Y-cadinene, caryophyllene, citronellal, P-cymene, decyl aldehyde, farnesol, farnesal, fenchone, geraniol, geranyl acetate, germacrene, limonene, methyl, heptenone, myrcene, nerolinol, nerol, ocimene, terpinene, α-pinene, β-phelandrene, β-myrcene, γ-terpinolene, octanal, decanal, octanol, isocitronelene, camphene, trans-p-menthane, p-mentha-1 (7), 8-diene, dihydromyrcenol, trans-dihydrocarvone, alpha-pinene, beta-pinene, estragole, longifolene, L-alpha-terpinol and can be used individually or two or more of them or in combination thereof.

The complementary acids may be selected from lactic acid, palmitic acid, formic acid, citric acid, oxalic acid, uric acid, ascorbic acid, malic acid, acetic acid and can be used individually or two or more of them or in combination thereof.

The complementary polysaccharides may be selected from glucose, ribose, deoxyribose, mannose, fructose, galactose, glyceraldehyde, erythrose, fucose and can be used individually or two or more of them or in combination thereof.

The vitamins may be selected from vitamin A, thiamine B1, riboflavine B2, niacinamide B3, pyridoxin B6, cobalamin B12, vitamin D, vitamin C, vitamin E, folic acid (vitamin B9), pantothenic acid (vitamin B5 or W) and can be used individually or two or more of them or in combination thereof.

Other organic compounds may be selected from bioflanoids, glycerin, pectins and amino acids and can be used alone or combined with two or more thereof.

Through the process of the present invention, mesoporous nanostructures are obtained, such as mesoporous nanospheres that have a high surface area, low density and good surface permeability due to the fact that it is a type of "core-shell" material with a special structure, the inner cavity can accommodate a large number of guest molecules, that is, it can achieve a high loading capacity of natural or synthetic substances, and the porous layer can be used as a channel for the release of natural or synthetic substances, that is, they have a slow release yield by adjusting the thickness of the coating, the pore size, the morphology of said pores and modification of their surface.

Definitions

Unless otherwise specified, a "nanosystem" will be understood herein as one comprising or being formed by one or more active ingredients (active substance(s) or molecule(s)) and a carrier system that can direct the release of the substance to a place or target in a lower and more effective dose.

In the present invention the term "fruits" shall be understood as the ovary of any plant species from the plant kingdom, developed after fertilization of the ovules, which will form the seed, regardless of the type of fruit, for example dried fruit or fleshy fruit. In addition to the ovary, some attached parts such as the receptacle, calyx, corolla, bracts, inflorescence axes, etc. can integrate the fruit.

"Essential oils" in the present invention shall be understood as volatile liquid fractions and which are complex mixtures of up to more than 100 components, such as low molecular weight aliphatic compounds (alkanes, alcohols, aldehydes, ketones, esters and acids), monoterpenes, sesquiterpenes, diterpenes, sesterpenes, triterpenes, carotenoids, resinoids, phenylpropanes, anaetol, anisaldehyde, bomeol, carvacrol, D-carvone, 1-carbona citral citronellal, geraniol, D-limonene, linalol, menthol, pinene, terpineol thymol, vanillin, alpha-ocimene, borneol, Y-cadinene, caryophyllene, citronellal, ID-cymene, decyl aldehyde, farnesol, farnesal, fenchone, geraniol, geranyl acetate, germacrene, limonene, methyl, heptenone, myrcene, nerolinol, nerol, ocimene, terpinene, α-pinene, β-phelandrene, β-myrcene, γ-terpinolene, octanal, decanal, octanol, isocitronlene, camphene, trans-p-menthane, p-mentha-1(7), 8-diene, dihydromyrcenol, trans-dihydrocarvone, alpha-pinene, beta-pinene, estragole, longifolene, L-alpha-terpinol. However, the term "essential oils" could also be understood according to the context described, as established by the International Organization for Standardization (ISO), which defines them as the product obtained from a natural plant raw material, by steam distillation, by mechanical processes of the epicarp of citrus fruits, or by dry distillation, after separation of the aqueous phase, if any, by physical processes.

The essential oils can be isolated from different parts of the plant, for example from the flowers of *Arnica montana, Lavandula* sp., *Chamaemelum nobile, Tanacetum cinerariifolium, Thymus* sp., *Syzygium aromaticum, Rosa* sp., *Geranium* sp., *Jasminum* sp., *Cananga odorata, Citrus aurantium* var. *Amara, Lavandula* sp., *Plumeria rubra, Borago officinalis, Erodium cicutarium, Gnaphalium* sp., *Heterotheca inuloides* Cass., *Lepidium virginicum* L., *Matricaria recutita* L., *Mirablis jalapa* L., *Tagetes lucida* Cali; from the roots of *Angelica archangelica, Asarum europaeum, Crocus sativus, Acorus calamus, Curcuma longa, Alpinia galanga, Zingiber officinale, Santalum album, Sassafras albidium, Valeriana officinalis, Chrysopogon zizanioides, Glycyrrhiza glabra* L., *Cinnamoum verum, Agave* spp.; the leaves of *Artemisia absinthium, Ocimum basilicum, Agathosma betulina, Aloysia citrodora, Eucalyptus* sp., *Mentha spicata, Cymbopogon, citratus, Origanum majorana, Mentha* sp., *Pogostemon cablin, Chenopodium ambrosioides, Salvia rosmarinus, Salvia officinalis, Melissa officinalis, Cinnamomun verum, Moringa oleifera, Organum vulgare* L., *Plantago major* L., *Taraxacum officinale* W.; the pericarp of the fruit of *Citrus bergamia, Citrus* x *lemon, Citrus reticulata, Citrus* x *sinensis, Citrus* x *aurantium, Citrus* x *latifolia, Citrus* x *paradisi, Agave* spp., *Juglans regia* L., *Punica granatum* L.; from the seeds of *Pimpinella anisum, Elettaria cardamomum, Morinda citrifolia, Anethum graveolens, Foeniculum vulgare, Cuminum cyminum, Salvia officinalis, Salvia hispanica, Capsicum annauum, Rosa rubiginosa, Vitis vinifera, Cocos nucifera, Argemone mexicana* L., *Avena sativa* from the fruits of *Carum carvi, Coriandrum sativum, Laurus nobilis, Myristica fragans, Petroselinum crispum, Piper nigrum, Morinda citrifolia*; on the stems or branches of *Cinnamomum verum, Cedrus* sp., *Pinus* sp., *Eucalyptus* sp., *Abies* sp., *Cupressus* sp., *Agave* spp., *Aloe barbadenesis* Mill.

The term "biocide" in a broad sense shall be understood as a chemical substance or of natural origin intended to destroy, counteract, neutralize, prevent action or exert any other type of control over any organism considered as harmful to both the animal and plant kingdoms. The foregoing includes viricides, antifungals, bactericides, pesticides, disinfectants, sanitizers, against all types of unicellular microorganisms, and germicide, etc.

Nevertheless, the term "biocide" could also be understood according to the context described, as established in Annex V of the Regulation on biocides of the EUROPEAN CHEMICAL AGENCY (ECHEA).

In the present application, the term "nanomaterial" will correspond to the definition adopted by the European Commission which establishes that a nanomaterial will be understood as a natural, incidental or manufactured material containing particles in an unbond state or as an aggregate or as an agglomerate and where, for 50% or more of the particles in the number size distribution, one or more external dimensions is in the size range 1 nm and 100 nm.

"Germicide" shall be understood as an agent that destroys germs that are harmful to both the animal kingdom and the plant kingdom.

The term "nanocomposite" refers to a one-dimensional, two-dimensional, three-dimensional system and amorphous materials, obtained from one or two components or materials on a nanometric scale, unless it is interpreted otherwise according to the context in which it is mentioned.

"Transition metals" will be understood as those classified in the Periodic Table that are not considered as toxic metals to mammals and plants, for example, manganese, iron, cobalt, nickel, copper, zinc, silver, platinum, gold.

"Toxic metals" are those whose concentration in the environment can cause damage to both the animal and plant kingdoms.

Synthesis of Materials $TiO_2$—ZnO nanocomposite was prepared by the sol-gel process using titanium (IV) butoxide (Aldrich 97%) and their respective salts as precursors: In a 3-neck flask, 30 to 50 mL of titanium (IV) butoxide, 4 g of polyethylene glycol (PEG) and 40 to 60 mL of ethanol (Aldrich 99.4%) were mixed. The obtained solution was heated to 60 to 120° C. under reflux and 18 mL of distilled water containing the appropriate average of $Zn(NO_3)\cdot 6H_2O$ were added in a separation funnel in the preparation of the materials with 1.0, 3.0, 5.0 and 10.0% by weight, then a few drops of $HNO_3$ (1 mol) were added to the solution of the respective metal salt until a pH=3 in the solution was achieved. Finally, the solution was added dropwise to abutoxide-ethanol solution (with a molar ratio of 8:1 butanol/water) after this the solution was mixed under magnetic stirring to form the gel. Then the solution was brought to 0° C. The solution was taken to the maturation process at 4° C.

The gel was then dried at 90 to 120° C. and the solid was ground to a fine powder in an agate mortar. The xerogel obtained was calcined between 400 and 600° C. in an air atmosphere, with a heating ramp of about 2° C./min, finally the product was ground again. As a reference, the pure $TiO_2$ sample was prepared in the same manner but no salt was added.

Functionalization

In order to functionalize the mixed oxide, the material was placed in a test tube in a microwave oven and the extract was added in a range of between 10 ml to 50 ml, in a pressure reactor and at a temperature between 60 to 90° C. for 10 min, after completion of said time, the supernatant was removed and the sample was dried and taken to the ultrasonicator for one hour and then to a centrifuge for 10 minutes at 6000 rpm where the supernatant was removed and the NPs acquired a color from orange to red. The material was dried for 1 day at 60 to 90° C. to prevent volatilization of the desired bioactive compounds.

Obtaining the Extract

Material such as fruit peels and seeds were dried and ground and sieved with a 500μ mesh. The dry matter was subjected to an ethanolic extraction using ultrasound-assisted extraction (UAE) (sonication). A dispersion with a 1:7.5 ratio of sample to solvent (95% EtOH) was prepared to a volume of 150 ml. The sonication conditions were between 40 and 60% amplifications, 0.6 s cycle for 10 to 30 min. After the UAE, the extracts were vacuum filtered using 20μ membranes. The extracts were then concentrated in a rotary evaporator. The solvent residues were removed in a hood under air recirculation at room temperature and with magnetic stirring. Finally, the extracts were stored at room temperature for later use in formulating the emulsions.

Determination of Surface Areas and Size Distribution of Solid Pores

Nitrogen Physisorption

The specific areas of the samples were calcined at 500° C., which are reported in Table 1. The results showed that the specific area calculated by the BET method of the $TiO_2$—ZnO semiconductors was larger than that obtained with $TiO_2$. A decrease in the areas is observed from 159 to 85 $m^2/g$ as the $Zn^{2+}$ content increases for the $TiO_2$—ZnO solids from 1 to 10%. This can be observed in the adsorption-desorption isotherms (FIG. 1) since the ones with the largest volume is the $TiO_2$—ZnO material at 1% by weight of Zn. The tendency of the materials can also be observed as the Zn content increases.

The isotherms of the materials (a-b) in FIG. 1, including pure $TiO_2$, were identified as type IV, typical features of mesoporous materials. In addition, the samples exhibited three different types of hysteresis: type H1 for 3%, type H2 for pure $TiO_2$, (1%) and 5%, and type H3 for the treatments (10%) and ($TiO_2$). The hysteresis loop associated with isotherms is attributed to capillary condensation of $N_2$ gas that occurs in the pores, which also confirms the presence of a mesoporous structure. The change in the hysteresis loop could be due to the existence of smaller or larger pores in the samples, when metal was synthesized with $TiO_2$ (Cu, Co, Ni, Cr, Pd, Zn and Sn) support.

TABLE 1

| Nitrogen Physisorption | | |
|---|---|---|
| ZnO (% by weight) | Area ($m^2/g$) | Pore Diameter (nm) |
| 1.0 | 159 | 7.8 |
| 3.0 | 104 | 9.4 |
| 5.0 | 102 | 9.6 |
| 10.0 | 85 | 7.6 |
| $TiO_2$ | 64 | 6.5 |

Figure 2:
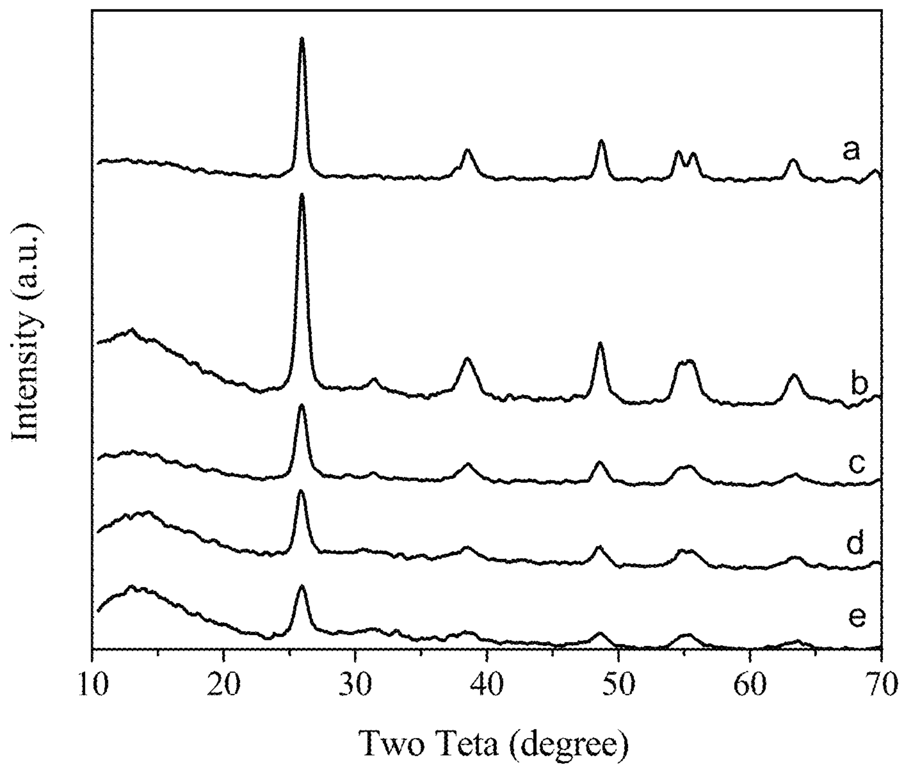
FIG. 2 shows the X-ray diffractograms for the mixed oxides of $TiO_2$—ZnO (a: $TiO_2$, b: 1.0% by weight of Zn, c: 3.0% by weight of Zn, d: 5.0% by weight of Zn, and e: 10.0% by weight of Zn).

The crystalline structure of pure $TiO_2$ and mixed oxides was determined by X-ray diffraction (XRD) analysis (see FIG. 2). Diffractograms of the materials show the anatase phase of $TiO_2$ corresponding to peaks at 2θ=25.3°, 37.9°, 47.8°, 54.5°, 55°, 62.5°, 69°, 70°, 75° and 82°, with a respective Miller index of (101), (103), (200), (105), (211), (204), (116), (220), (215) and (303) planes (JCPDS 21-1272). Furthermore, the characteristic diffraction peaks of the ZnO structures around 2θ=31.7°, 34.5°, 36.3°, 47.5°, 56° and 62.7°, are not observed, therefore these results suggest that some $Zn^{2+}$ cations were incorporated into the titanium dioxide (or titania) lattice, as evidenced by the increase in the cell parameter with respect to the Zn content (Table 1). However, due to the high specific area shown in mixed oxides, it is highly likely that ZnO is so dispersed forming conglomerates on the surface of titanium dioxide (or titania) and is not detectable by XRD.

RAMAN Spectroscopy

Figure 3:
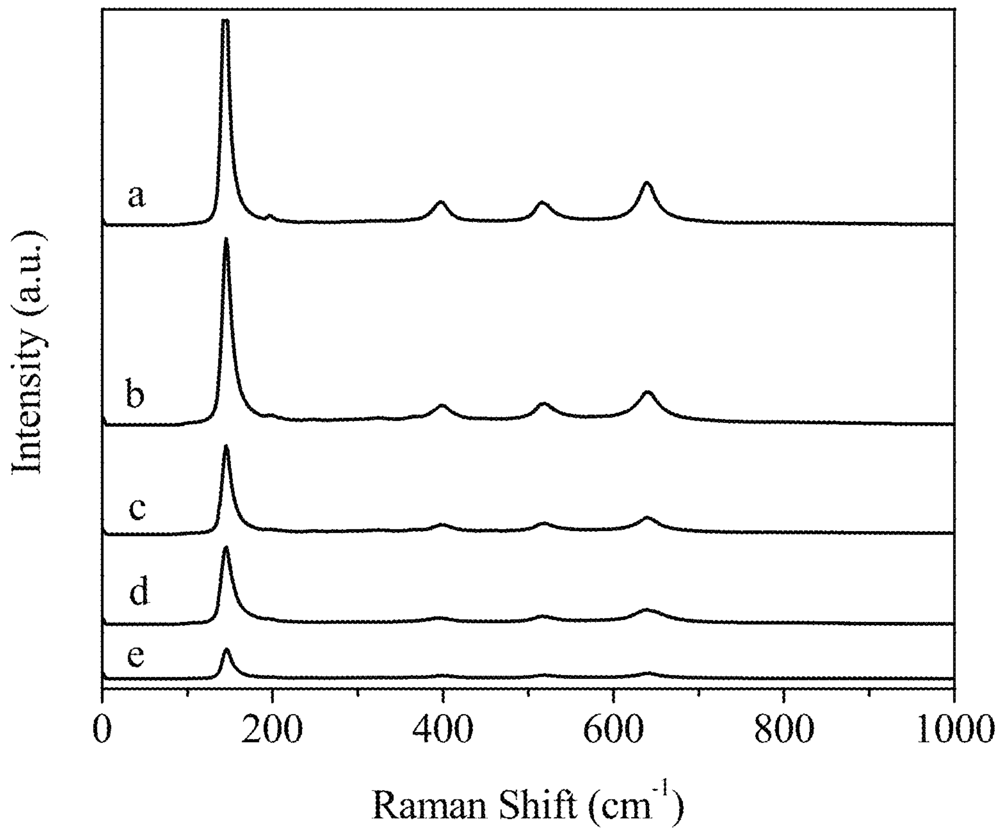
FIG. 3 shows the Raman spectra of $TiO_2$—ZnO (a: $TiO_2$, b: 1.0% by weight of Zn, c: 3.0% by weight of Zn, d: 5.0% by weight of Zn and e: 10.0% by weight of Zn).

The Raman spectra of the $TiO_2$—ZnO samples are shown in FIG. 3. All Raman peaks are characteristic of the anatase phase. Bands at 145 $cm^{-1}$, 395 $cm^{-1}$, 513 $cm^{-1}$ and 640 $cm^{-1}$ are related to the $TiO_2$ nanocrystals, which were previously identified. The intensity of the peaks decreases as $Zn^{2+}$ content increases, indicating a significant decrease in the crystallinity of the mixed oxides. These results are consistent with those obtained by XRD, where the smallest crystal size corresponds to the highest $Zn^{2+}$ content.

Diffuse Reflectance UV-Vis Spectroscopy

Figure 4:
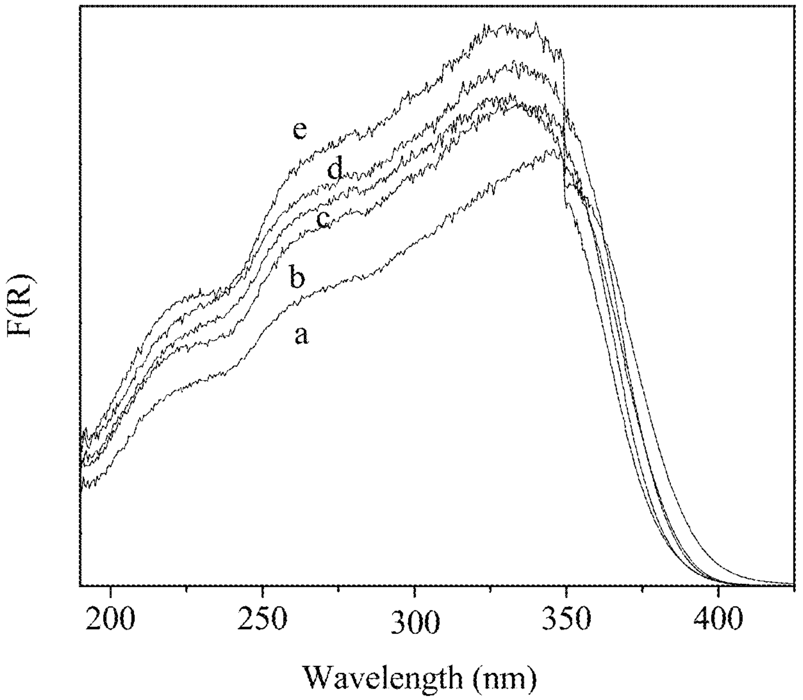
FIG. 4 shows the UV-Vis spectra of the $TiO_2$—ZnO semiconductors (a: $TiO_2$, b: 1.0% by weight of Zn, c: 3.0% by weight of Zn, d: 5.0% by weight of Zn and e: 10.0% by weight of Zn).

UV-Vis spectra were performed to investigate the effect of ZnO on the photophysical properties of $TiO_2$—ZnO semiconductors. FIG. 4 shows the diffuse reflectance UV-Vis spectra of the materials. All samples show an optical absorption below 400 nm, which can be attributed to the electronic Ti—O transition of the $TiO_2$ nanocrystals. The results show a small shift in the red region (3.12-3.03 eV) for $TiO_2$—ZnO samples compared to the reference of anatase phase of the $TiO_2$ semiconductor (3.2 eV). Thus, the effect of ZnO within the $TiO_2$ lattice exerts only small variations in the forbidden energy band.

For the evaluations of the $TiO_2$—ZnO functionalized extract, seven reference strains (6 bacteria and 1 yeast) according to the American Type Culture Collection (ATCC), and two control bacterial strains (see Table 2) were used:

TABLE 2

| Strains used in the extract evaluations | ID number |
|---|---|
| 1.-*Aeromonas hydrophyla* | ATCC 12600 (reference strain) |
| 2.-*Escherichia coli* | ATCC 8739 (reference strain) |
| 3.-*Enterococcus fecalis* | ATCC 10541 (reference strain) |
| 4.-*Staphylococcus aureus* | ATCC 12600 (reference strain) |
| 5.-*Candida albicans* | ATCC 90028 (reference strain) |
| 6.-*Listeria monocytogenes* | ATCC 19115 (reference strain) |
| 7.-*Escherichia coli* | ATCC 25922 (control strain) |
| 8.-*Staphylococcus aureus* | ATCC 25923 (control strain) |
| 9.-*Salmonella enterica* subsp. *enterica* serovar Paratyphi | ATCC 9150 (reference strain) |

All the nine strains were inoculated in three different media at a concentration of 0.5 according to the McFarland nephelometer. No growth of any of the strains was observed in both concentrations 9:1 and 9.5:5 after incubating 48 h at 37° C. In contrast, growth of all strains was indeed observed in GN (culture medium without extract) (FIG. 1).

FIGS. 5*a* to 5*d* show the distribution and the manner in which the $TiO_2$—ZnO nanoparticles agglomerate (a): 1.0% Zn, (b): 3.0% Zn, (c): 5.0% Zn and (d): 10.0% Zn).

FIGS. 6*a*-6*d*, corresponding to a transmission electron microscopy (TEM) study, show in detail the morphology, size (20 nm) and crystallization of the nanosystem obtained by the method of the present invention.

FIGS. 7*a*-7*c* show the Evaluation of 7 ATCC reference strains and 2 control strains: 7*a*) nutritive agar medium without extract; 7*b*) nutritive agar with 100% plant extract, 7*c*) nutritive agar with 50% plant extract. On each plate: A1-D1 *Aeromonas hydrophyla* ATCC 12600, A2-D2 *Escherichia coli* ATCC 8739, A3-D3 *Enterococcus fecalis* ATCC 10541, A4-D4 *Staphylococcus aureus* ATCC 12600, A5-D5 *Candida albicans* ATCC 90028, A6-D6 *Listeria monocytogenes* ATCC 19115, E1-F2 *Escherichia coli* ATCC 25922 (control strain), E3-F4 *Staphylococcus aureus* ATCC 25923 (control strain), E5-F6 *Salmonella enterica* subsp. *enterica* serovar Paratyphi AATCC 9150.

Therefore, samples 9:1 and 9.5:5 do inhibit the growth of *Aeromonas hydrophyla* ATCC12600, *Escherichia coli* ATCC 8739, *Enterococcus fecalis* ATCC 10541, *Staphylococcus aureus* ATCC 12600, *Candida albicans* ATCC 90028 and *Listeria monocytogenes* ATCC 19115 and *Salmonella enterica subsp. enterica* serovar Paratyphi AATCC 9150 strains.

FIG. 8 is a photomicrograph showing the variations in size and "nanospheric" or "nano-droplet" shape of the nanoparticles of the nanosystem, for which the particle sizes shown therein are not entirely representative of the real size, since it was only an attempt to obtain the size of the particles of the nanosystem, in addition to the fact that one skilled in the art should understand that the determination of particle size is more reliable through the TEM characterization (as in FIGS. 5*a* to 6*d*) than in the SEM study.

EXAMPLES AND RESULTS

BIOLOGICAL EFFECTIVITY (BE) TESTS IN AGRICULTURAL CROPS ACCORDING WITH THE Official Mexican Standard NOM-032-FITO-1995

| COMMON NAME OF THE CROP | SCIENTIFIC NAME OF THE CROP | SCIENTIFIC NAME OF THE PATHOGEN | COMMON NAME OF THE DISEASE AND/OR PATHOGEN |
|---|---|---|---|
| Fungi (fungi spp.) | | | |
| Tomato<br>Aubergine<br>Chili<br>Pepper<br>Tobacco<br>Potato | *Solanum Lycopersicum*<br>*Solanum melongena*<br>*Capsicum annum*<br>*Capsicum annum*<br>*Nicotiana tabacum*<br>*Solanum tuberosum* | *Phytophthora infestans* | Late blight |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare, commercial, control cooper sulphate 350 g per hectare, and Absolute control with no application.<br>Total applications: 5 at 7-day intervals.<br>BE measurement parameters and phytotoxicity: Townsend Heuberger Formula; Variance analysis, Turkey's multiple comparison test.<br>Phenological state of the crop: Growing period<br>Application was done on foliage with a motorized knapsack sprayer calibrated according to the doses used. | | |
| Results | The optimal nanosystem dose was 1.0 liter per hectare with an 83% of control and caused no negative phytotoxic effects on the crop. | | |
| Coffee | *Coffea* | *Hemilela vastatrix* | Coffe leaf rust |

-continued

| BIOLOGICAL EFFECTIVITY (BE) TESTS IN AGRICULTURAL CROPS ACCORDING WITH THE Official Mexican Standard NOM-032-FITO-1995 | | | |
|---|---|---|---|
| COMMON NAME OF THE CROP | SCIENTIFIC NAME OF THE CROP | SCIENTIFIC NAME OF THE PATHOGEN | COMMON NAME OF THE DISEASE AND/OR PATHOGEN |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare, commercial, control cooper sulphate 350 g per hectare, and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with an 85% of control and caused no negative phytotoxic effects on the crop. | | |
| Potato | *Solanum tuberosum* | *Fusarium* sp. | Dry rot |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare, commercial, control cooper sulphate 350 g per hectare, and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosytem dose was 1.0 liter per hectare with an 81% of control and caused no negative phytotoxic effects on the crop. | | |
| Papaya | *Carica papaya* | *Colletotrichum* sp | Anthracnose |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. EB measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with an 81% of control and caused no negative phytotoxic effects on the crop. | | |
| Raspberry<br>Strawberry<br>Blackberry<br>Blueberry<br>Currant | *Rubus idaeus*<br>*Fragaria mexicana*<br>*Rubus ulmifolius*<br>*Vaccinium myrtillus*<br>*Ribes rubrum* | *Botrytis* sp. | Botrytis fruit rot |

-continued

BIOLOGICAL EFFECTIVITY (BE) TESTS IN AGRICULTURAL CROPS ACCORDING WITH THE Official Mexican Standard NOM-032-FITO-1995

| COMMON NAME OF THE CROP | SCIENTIFIC NAME OF THE CROP | SCIENTIFIC NAME OF THE PATHOGEN | COMMON NAME OF THE DISEASE AND/OR PATHOGEN |
|---|---|---|---|
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare, commercial, control cooper sulphate 350 g per hectare, and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with an 84% of control and caused no negative phytotoxic effects on the crop. | | |
| Avocado | *Persea americana* | *Phytophthora* spp. | Avocado sadness |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with an 84% of control and caused no negative phytotoxic effects on the crop. | | |
| Bell Pepper | *Capsicum annuum* | *Pythium aphanidermatum* | Damping off |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with an 86% of control and caused no negative phytotoxic effects on the crop. | | |
| Bell Pepper | *Capsicum annuum* | *Rhizoctonia solani* | Damping off |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. | | |

-continued

BIOLOGICAL EFFECTIVITY (BE) TESTS IN AGRICULTURAL CROPS ACCORDING WITH THE Official Mexican Standard NOM-032-FITO-1995

| COMMON NAME OF THE CROP | SCIENTIFIC NAME OF THE CROP | SCIENTIFIC NAME OF THE PATHOGEN | COMMON NAME OF THE DISEASE AND/OR PATHOGEN |
|---|---|---|---|
| | Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with an 87% of control and caused no negative phytotoxic effects on the crop. | | |
| Cut Rose | *Rosa canina* | *Peronospora* sp. | Peronospora |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with an 89% of control and caused no negative phytotoxic effects on the crop. | | |
| Cut Rose | *Rosa canina* | *Podosphaera pannosa* | Powdery mildew |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with an 88% of control and caused no negative phytotoxic effects on the crop. | | |
| Cut Rose | *Rosa canina* | *Verticillum* spp. | Yellowing |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |

-continued

BIOLOGICAL EFFECTIVITY (BE) TESTS IN AGRICULTURAL CROPS ACCORDING WITH THE Official Mexican Standard NOM-032-FITO-1995

| COMMON NAME OF THE CROP | SCIENTIFIC NAME OF THE CROP | SCIENTIFIC NAME OF THE PATHOGEN | COMMON NAME OF THE DISEASE AND/OR PATHOGEN |
|---|---|---|---|
| Results | The optimal nanosystem dose was 1.0 liter per hectare with an 89% of control and caused no negative phytotoxic effects on the crop. | | |
| Green tomato | *Physalis ixocarpa* | *Phytophthora infestans* | Late blight |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with an 89% of control and caused no negative phytotoxic effects on the crop. | | |
| Banana | *Musa paradisiaca* | *Sigatoka negra* | Sigatoka |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with an 86% of control and caused no negative phytotoxic effects on the crop. | | |
| Pumpkin | *Cucurbita pepo* | *Sphaerotheca fuliginea* | Powdery mildew |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with an 87% of control and caused no negative phytotoxic effects on the crop. | | |
| Cucumber | *Cucumis sativus* | *Sphaerotheca fuliginea* | Powdery mildew |
| Dose per hectare | 0.75, 1.0 and 1.25 L in 200 L of water | Concentration of the active agent (nanosystem) | 10% |

-continued

| BIOLOGICAL EFFECTIVITY (BE) TESTS IN AGRICULTURAL CROPS ACCORDING WITH THE Official Mexican Standard NOM-032-FITO-1995 | | | |
|---|---|---|---|
| COMMON NAME OF THE CROP | SCIENTIFIC NAME OF THE CROP | SCIENTIFIC NAME OF THE PATHOGEN | COMMON NAME OF THE DISEASE AND/OR PATHOGEN |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application.<br>Total applications: 5 at 7-day intervals.<br>BE measurement parameters and phytotoxicity: Townsend and Heuberger Formula; Variance analysis, Turkey's multiple comparison test.<br>Phenological state of the crop: Growing period<br>Application was done on foliage with a motorized knapsack sprayer calibrated according to the doses used. | | |
| Results | The optimal nanosystem dose was 1.0 liter per hectare with an 88% of control and caused no negative phytotoxic effects on the crop. | | |
| Cocoa | *Theobroma cacao* | *Moniliophthora perniciosao* | Witches' broom |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application.<br>Total applications: 5 at 7-day intervals.<br>BE measurement parameters and phytotoxicity: Townsend and Heuberger Formula; Variance analysis, Turkey's multiple comparison test.<br>Phenological state of the crop: Growing period<br>Application was done on foliage with a motorized knapsack sprayer calibrated according to the doses used. | | |
| Results | The optimal nanosystem dose was 1.0 liter per hectare with a 90% of control and caused no negative phytotoxic effects on the crop. | | |
| Cocoa | *Theobroma cacao* | *Crinipellis perniciosao* | Witches' broom |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application.<br>Total applications: 5 at 7-day intervals.<br>BE measurement parameters and phytotoxicity: Townsend and Heuberger Formula; Variance analysis, Turkey's multiple comparison test.<br>Phenological state of the crop: Growing period<br>Application was done on foliage with a motorized knapsack sprayer calibrated according to the doses used. | | |
| Results | The optimal nanosystem dose was 1.0 liter per hectare with an 85% of control and caused no negative phytotoxic effects on the crop. | | |
| Mango | *Mangifera indica* | *Fusarium moniliforme* | Witches' broom |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application.<br>Total applications: 5 at 7-day intervals.<br>BE measurement parameters and phytotoxicity: Townsend and Heuberger Formula; Variance analysis, Turkey's multiple comparison test. | | |

-continued

BIOLOGICAL EFFECTIVITY (BE) TESTS IN AGRICULTURAL CROPS ACCORDING WITH THE Official Mexican Standard NOM-032-FITO-1995

| COMMON NAME OF THE CROP | SCIENTIFIC NAME OF THE CROP | SCIENTIFIC NAME OF THE PATHOGEN | COMMON NAME OF THE DISEASE AND/OR PATHOGEN |
|---|---|---|---|
| | Phenological state of the crop: Growing period Application was done on foliage with a motorized knapsack sprayer calibrated according to the doses used. | | |
| Results | The optimal nanosystem dose was 1.0 liter per hectare with an 86% of control and caused no negative phytotoxic effects on the crop. | | |
| Mango | *Mangifera indica* | *Fusarium oxysporum* | Witches' broom |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with an 86% of control and caused no negative phytotoxic effects on the crop. | | |
| Avocado | *Persea americana* | *Colletotrichum acuatatum* | Anthracnose |
| Dose per hectare | 0.75, 1.0 and 1.25 L in 200 L of water | Concentration of the active agent (nanosystem) | 10% |
| | Statistic design: complete random blocks with five treatments, three of the nanosystem that is being tested with 0.75, 1.0 and 1.25 L per hectare; commercial control, cooper sulphate 350 g per hectare; and Absolute control with no application. | | |
| Test method | Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with an 88% of control and caused no negative phytotoxic effects on the crop. | | |
| Avocado | *Persea americana* | *Sphaceloma perseae* | Avocado scab |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |

-continued

| BIOLOGICAL EFFECTIVITY (BE) TESTS IN AGRICULTURAL CROPS ACCORDING WITH THE Official Mexican Standard NOM-032-FITO-1995 | | | |
|---|---|---|---|
| COMMON NAME OF THE CROP | SCIENTIFIC NAME OF THE CROP | SCIENTIFIC NAME OF THE PATHOGEN | COMMON NAME OF THE DISEASE AND/OR PATHOGEN |
| Results | The optimal nanosystem dose was 1.0 liter per hectare with an 85% of control and caused no negative phytotoxic effects on the crop. | | |
| Garlic | *Allium sativum* | *Sclerotium cepivorum* | White rot |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application.<br>Total applications: 5 at 7-day intervals.<br>BE measurement parameters and phytotoxicity: Townsend and Heuberger Formula; Variance analysis, Turkey's multiple comparison test.<br>Phenological state of the crop: Growing period<br>Application was done on foliage with a motorized knapsack sprayer calibrated according to the doses used. | | |
| Results | The optimal nanosystem dose was 1.0 liter per hectare with an 88% of control and caused no negative phytotoxic effects on the crop. | | |
| Onion | *Allium cepa* | *Pyrenochaeta terrestris* | Pink root |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application.<br>Total applications: 5 at 7-day intervals.<br>BE measurement parameters and phytotoxicity: Townsend and Heuberger Formula; Variance analysis, Turkey's multiple comparison test.<br>Phenological state of the crop: Growing period<br>Application was done on foliage with a motorized knapsack sprayer calibrated according to the doses used. | | |
| Results | The optimal nanosystem dose was 1.0 liter per hectare with an 89% of control and caused no negative phytotoxic effects on the crop. | | |
| Onion | *Allium cepa* | *Sclerotium cepivorum* | White rot |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application.<br>Total applications: 5 at 7-day intervals.<br>BE measurement parameters and phytotoxicity: Townsend and Heuberger Formula; Variance analysis, Turkey's multiple comparison test.<br>Phenological state of the crop: Growing period<br>Application was done on foliage with a motorized knapsack sprayer calibrated according to the doses used. | | |
| Results | The optimal nanosystem dose was 1.0 liter per hectare with an 88% of control and caused no negative phytotoxic effects on the crop. | | |

-continued

| BIOLOGICAL EFFECTIVITY (BE) TESTS IN AGRICULTURAL CROPS ACCORDING WITH THE Official Mexican Standard NOM-032-FITO-1995 | | | |
|---|---|---|---|
| COMMON NAME OF THE CROP | SCIENTIFIC NAME OF THE CROP | SCIENTIFIC NAME OF THE PATHOGEN | COMMON NAME OF THE DISEASE AND/OR PATHOGEN |
| Barley | *Hordeum vulgare* | *Puccinia hordei* | Barley rust |
| Dose per hectare | 0.75, 1.0 and 1.25 L in 200 L of water | Concentration of the active agent (nanosystem) | 10% |
| Test method | Statistic design: of the nanosystem that is being treatments, three complete random blocks with five tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with a 90% of control and caused no negative phytotoxic effects on the crop. | | |
| Bean | *Phaseolus vulgaris* | *Uromyces phaseoli* | Bean rust |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with an 84% of control and caused no negative phytotoxic effects on the crop. | | |
| Peach | *Prunus persica* | *Sphaerotheca panosa* | Powdery mildew |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with an 82% of control and caused no negative phytotoxic effects on the crop. | | |
| Strawberry | *Fragaria mexicana* | *Botrytis cinerea* | Botrytis fruit rot |
| Dose per hectare | 0.75, 1.0 and 1.25 L in 200 L of water | Concentration of the active agent (nanosystem) | 10% |

-continued

| BIOLOGICAL EFFECTIVITY (BE) TESTS IN AGRICULTURAL CROPS ACCORDING WITH THE Official Mexican Standard NOM-032-FITO-1995 | | | |
|---|---|---|---|
| COMMON NAME OF THE CROP | SCIENTIFIC NAME OF THE CROP | SCIENTIFIC NAME OF THE PATHOGEN | COMMON NAME OF THE DISEASE AND/OR PATHOGEN |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with an 86% of control and caused no negative phytotoxic effects on the crop. | | |
| Olive | *Olea europaea* | *Cycloconium oleaginea* | Peacock eye |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with an 88% of control and caused no negative phytotoxic effects on the crop. | | |
| Carrot | *Daucus carota* | *Rhizoctonia carotae* | Crater rot |
| Dose per hectare | 0.75, 1.0 and 1.25 L in 200 L of water | Concentration of the active agent (nanosystem) | 10% |
| Test method | Statistic design: of the nanosystem that is being treatments, three complete random blocks with five tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with an 81% of control and caused no negative phytotoxic effects on the crop. | | |
| Grape | *Vitis vinifera* | *Botrytis cinerea* | Gray-mold rot |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. | | |

-continued

BIOLOGICAL EFFECTIVITY (BE) TESTS IN AGRICULTURAL CROPS ACCORDING WITH THE Official Mexican Standard NOM-032-FITO-1995

| COMMON NAME OF THE CROP | SCIENTIFIC NAME OF THE CROP | SCIENTIFIC NAME OF THE PATHOGEN | COMMON NAME OF THE DISEASE AND/OR PATHOGEN |
|---|---|---|---|
| | Phenological state of the crop: Growing period Application was done on foliage with a motorized knapsack sprayer calibrated according to the doses used. | | |
| Results | The optimal nanosystem dose was 1.0 liter per hectare with an 88% of control and caused no negative phytotoxic effects on the crop. | | |
| Raspberry | *Rubus idaeus* | *Pucciniastrum americanum* | Rust |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with an 88% of control and caused no negative phytotoxic effects on the crop. | | |
| Guava | *Psidium guajava* | *Colletotrichum gloeosporioides* | Guava cloves |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with an 87% of control and caused no negative phytotoxic effects on the crop. | | |
| Mexican Lemon Persian Lime Orange Grapefruit | *Citrus x aurantiifolia* *Citrus limettioides* *Citrus x sinensis* *Citrus aurantium* | *Phytophthora citrophthora* | Gummosis |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. | | |

-continued

BIOLOGICAL EFFECTIVITY (BE) TESTS IN AGRICULTURAL CROPS ACCORDING WITH THE Official Mexican Standard NOM-032-FITO-1995

| COMMON NAME OF THE CROP | SCIENTIFIC NAME OF THE CROP | SCIENTIFIC NAME OF THE PATHOGEN | COMMON NAME OF THE DISEASE AND/OR PATHOGEN |
|---|---|---|---|
| | Phenological state of the crop: Growing period Application was done on foliage with a motorized knapsack sprayer calibrated according to the doses used. | | |
| Results | The optimal nanosystem dose was 1.0 liter per hectare with a 90% of control and caused no negative phytotoxic effects on the crop. | | |
| Mexican Lemon Persian Lime Orange Grapefruit | *Citrus x aurantiifolia Citrus limettioides Citrus x sinensis Citrus aurantium* | *Fusarium oxysporum* | Root rot |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayere calibrated according to the doses used. | | |
| Results | The optimal nanosystem dose was 1.0 liter per hectare with a 91% of control and caused no negative phytotoxic effects on the crop. | | |
| Tomato | *Solanum Lycopersicum* | *Phytophtora capsici* | Smut and wilt in chili and pepper |
| Dose per hectare | 0.75, 1.0 and 1.25 L in 200 L of water | Concentration of the active agent (nanosystem) | 10% |
| Test method | Statistical design: IN VITRO fungicidal activity (percentage of inhibition) of the nanosystem that is being tested with 1:2500, 1:5000, and 1:7500 ml of product/ml of water; absolute control. The culture medium was used as product diluent, with 4 repetitions for each treatment. All treatments were cultured at the same time and incubated at 28° C. for 6 and 8 days according to the growth of each microorganism. Measurements were made every 24 h. | | |
| Results | The optimal dose of nanosystem was 1 mL in 2500 mL with 100% of inhibition. | | |
| Tomato | *Solanum Lycopersicum* | *Fusarium oxysporum* ~~*Phytophtora capsici*~~ | Wilt ~~Smut and wilt in chili and pepper~~ |
| Dose per hectare | 0.75, 1.0 and 1.25 L in 200 L of water | Concentration of the active agent (nanosystem) | 10% |
| Test method | Statistical design: IN VITRO fungicidal activity (percentage of inhibition) of the nanosystem that is being tested with 1:2500, 1:5000, and 1:7500 ml of product/ml of water; absolute control. The culture medium was used as product diluent, with 4 repetitions for each treatment. All treatments were cultured at the same time and incubated at 28° C. for 6 and 8 days according to the growth of each microorganism. Measurements were made every 24 h. | | |

-continued

| BIOLOGICAL EFFECTIVITY (BE) TESTS IN AGRICULTURAL CROPS ACCORDING WITH THE Official Mexican Standard NOM-032-FITO-1995 | | | |
|---|---|---|---|
| COMMON NAME OF THE CROP | SCIENTIFIC NAME OF THE CROP | SCIENTIFIC NAME OF THE PATHOGEN | COMMON NAME OF THE DISEASE AND/OR PATHOGEN |
| Results | The optimal dose of nanosystem was 1 mL in 2500 mL with 100% of inhibition. | | |
| Tomato | *Solanum Lycopersicum* | *Fusarium Lycopersici* | Vascular wilt |
| Dose per hectare | 0.75, 1.0 and 1.25 L in 200 L of water | Concentration of the active agent (nanosystem) | 10% |
| Test method | Statistical design: IN VITRO fungicidal activity (percentage of inhibition) of the nanosystem that is being tested with 1:2500, 1:5000, and 1:7500 mL of product/mL of water; absolute control.<br>The culture medium was used as product diluent, with 4 repetitions for each treatment. All treatments were cultured at the same time and incubated at 28° C. for 6 and 8 days according to the growth of each microorganism.<br>Measurements were made every 24 h. | | |
| Results | The optimal dose of nanosystem was 1 mL in 2500 ml with 100% of inhibition. | | |
| Tomato | *Solanum Lycopersicum* | *Rhizoctonia solani* | Smut and root rot |
| Dose per hectare | 0.75, 1.0 and 1.25 L in 200 L of water | Concentration of the active agent (nanosystem) | 10% |
| Test method | Statistical design: IN VITRO fungicidal activity (percentage of inhibition) of the nanosystem that is being tested with 1:2500, 1:5000, and 1:7500 mL of product/mL of water; absolute control.<br>The culture medium was used as product diluent, with 4 repetitions for each treatment. All treatments were cultured at the same time and incubated at 28° C. for 6 and 8 days according to the growth of each microorganism.<br>Measurements were made every 24 h. | | |
| Results | The optimal dose of nanosystem was 1 mL in 2500 ml with 100% of inhibition. | | |
| | Bacteria | | |
| Prickly pear (nopal) | *Opuntia* spp. | *Erwinia* spp. | White rot |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application.<br>Total applications: 5 at 7-day intervals.<br>BE measurement parameters and phytotoxicity: Townsend and Heuberger Formula; Variance analysis, Turkey's multiple comparison test.<br>Phenological state of the crop: Growing period<br>Application was done on foliageprickly pear (or flower) with a motorized knapsack sprayer calibrated according to the doses used. | | |
| Results | The optimal nanosystem dose was 1.0 liter per hectare with an 88% of control and caused no negative phytotoxic effects on the crop. | | |
| Lettuce | *Lactuca sativa* | *Escherichia coli* | *E. coli* |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application.<br>Total applications: 5 at 7-day intervals.<br>BE measurement parameters and phytotoxicity: Townsend and Heuberger Formula; Variance analysis, Turkey's multiple comparison test.<br>Phenological state of the crop: Growing period | | |

-continued

| BIOLOGICAL EFFECTIVITY (BE) TESTS IN AGRICULTURAL CROPS ACCORDING WITH THE Official Mexican Standard NOM-032-FITO-1995 | | | |
|---|---|---|---|
| COMMON NAME OF THE CROP | SCIENTIFIC NAME OF THE CROP | SCIENTIFIC NAME OF THE PATHOGEN | COMMON NAME OF THE DISEASE AND/OR PATHOGEN |
| | Application was done on foliage with a motorized knapsack sprayer calibrated according to the doses used. | | |
| Results | The optimal nanosystem dose was 1.0 liter per hectare with a 98% of control and caused no negative phytotoxic effects on the crop. | | |
| Blue Agave | *Agave tequilana* | *Erwinia* spp. | Agave's bacteria |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application.<br>Total applications: 5 at 7-day intervals.<br>BE measurement parameters and phytotoxicity: Townsend and Heuberger Formula; Variance analysis, Turkey's multiple comparison test.<br>Phenological state of the crop: Growing period<br>Application was done on foliage with a motorized knapsack sprayer calibrated according to the doses used. | | |
| Results | The optimal nanosystem dose was 1.0 liter per hectare with a 92% of control and caused no negative phytotoxic effects on the crop. | | |
| Potato | *Solanum tuberosum* | *Clostridium* spp. | Botulism |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application.<br>Total applications: 5 at 7-day intervals.<br>BE measurement parameters and phytotoxicity: Townsend and Heuberger Formula; Variance analysis, Turkey's multiple comparison test.<br>Phenological state of the crop: Growing period<br>Application was done on foliage with a motorized knapsack sprayer calibrated according to the doses used. | | |
| Results | The optimal nanosystem dose was 1.0 liter per hectare with a 93% of control and caused no negative phytotoxic effects on the crop. | | |
| Tomato | *Solanum Lycopersicum* | *Streptomyces scabies* | Common scab |
| Dose per hectare | 0.75, 1.0 and 1.25 L in 200 L of water | Concentration of the active agent (nanosystem) | 10% |
| Test method | Statistical design: IN VITRO; culture media Mueller-Hinton in complete blocks with four repetitions in each treatment, three of the nanosystem that is being tested with 1:1000, 1:2000, and 1:4000 mL of product/mL of water; absolute control.<br>Incubated at 28° C. for 48 hours with measurements made every 24 h.<br>Bactericidal activity parameter (inhibition halos) was measured in vitro by the Kirby-Bauer method. | | |
| Results | The optimal dose of nanosystem was 1 mL in 2500 mL with 100% of inhibition. | | |
| Tomato | *Solanum Lycopersicum* | *Xantomona euvesicatoria* | Bacterial spot |
| Dose per hectare | 0.75, 1.0 and 1.25 L in 200 L of water | Concentration of the active agent (nanosystem) | 10% |
| Test method | Statistical design: IN VITRO; culture media Mueller-Hinton in complete blocks with four repetitions in each | | |

-continued

BIOLOGICAL EFFECTIVITY (BE) TESTS IN AGRICULTURAL CROPS ACCORDING WITH THE Official Mexican Standard NOM-032-FITO-1995

| COMMON NAME OF THE CROP | SCIENTIFIC NAME OF THE CROP | SCIENTIFIC NAME OF THE PATHOGEN | COMMON NAME OF THE DISEASE AND/OR PATHOGEN |
|---|---|---|---|
| | treatment, three of the nanosystem that is being tested with 1:1000, 1:2000, and 1:4000 mL of product/mL of water; absolute control.<br>Incubated at 28° C. for 48 hours with measurements made every 24 h.<br>Bactericidal activity parameter (inhibition halos) was measured in vitro by the Kirby-Bauer method. | | |
| Results | The optimal dose of nanosystem was 1 mL in 1000 mL with control of 13.01 mm. | | |
| Tomato | *Solanum Lycopersicum* | *Ralstonia solanacearum* | Bacterial wilt |
| Dose per hectare | 0.75, 1.0 and 1.25 L in 200 L of water | Concentration of the active agent (nanosystem) | 10% |
| Test method | Statistical design: IN VITRO; culture media Mueller-Hinton in complete blocks with four repetitions in each treatment, three of the nanosystem that is being tested with 1:1000, 1:2000, and 1:4000 mL of product/mL of water; absolute control.<br>Incubated at 28° C. for 48 hours with measurements made every 24 h.<br>Bactericidal activity parameter (inhibition halos) was measured in vitro by the Kirby-Bauer method. | | |
| Results | The optimal dose of nanosystem was 1 mL in 1000 mL with control of 14.05 mm. | | |
| Tomato | *Solanum Lycopersicum* | *Pseudomona corrugata* | Tomato pith necrosis |
| Dose per hectare | 0.75, 1.0 and 1.25 L in 200 L of water | Concentration of the active agent (nanosystem) | 10% |
| Test method | Statistical design: IN VITRO; culture media Mueller-Hinton in complete blocks with four repetitions in each treatment, three of the nanosystem that is being tested with 1:1000, 1:2000, and 1:4000 mL of product/mL of water; absolute control.<br>Incubated at 28° C. for 48 hours with measurements made every 24 h.<br>Bactericidal activity parameter (inhibition halos) was measured in vitro by the Kirby-Bauer method. | | |
| Results | The optimal dose of nanosystem was 1 mL in 1000 mL with control of 12.87 mm. | | |
| Tomato | *Solanum Lycopersicum* | *Clavibacter michiganensis* | Bird's eye, bird's eye spot, and bacterial wilt |
| Dose per hectare | 0.75, 1.0 and 1.25 L in 200 L of water | Concentration of the active agent (nanosystem) | 10% |
| Viruses | | | |
| Chili | *Capsicum annum* | *PVH* | Huasteco virus |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application.<br>Total applications: 5 at 7-day intervals.<br>BE measurement parameters and phytotoxicity: Townsend and Heuberger Formula; Variance analysis, Turkey's multiple comparison test.<br>Phenological state of the crop: Growing period<br>Application was done on foliage with a motorized knapsack sprayer calibrated according to the doses used. | | |
| Results | The optimal nanosystem dose was 1.0 liter per hectare with a 92% of control and caused no negative phytotoxic effects on the crop. | | |

-continued

BIOLOGICAL EFFECTIVITY (BE) TESTS IN AGRICULTURAL CROPS ACCORDING WITH THE Official Mexican Standard NOM-032-FITO-1995

| COMMON NAME OF THE CROP | SCIENTIFIC NAME OF THE CROP | SCIENTIFIC NAME OF THE PATHOGEN | COMMON NAME OF THE DISEASE AND/OR PATHOGEN |
|---|---|---|---|
| Serrano chili pepper | *Capsicum annuum* | *TMV* | Tobacco mosaic |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with a 91% of control and caused no negative phytotoxic effects on the crop. | | |
| Bell Pepper | *Capsicum annuum* | *TEV* | Tobacco Etch |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with a 94% of control and caused no negative phytotoxic effects on the crop. | | |
| Habanero chili | *Capsicum annuum* | *CMV* | Cytomegalovirus |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with a 94% of control and caused no negative phytotoxic effects on the crop. | | |
| Pasilla Pepper | *Capsicum annuum* | *TMV* | Tobacco mosaic |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; | | |

-continued

BIOLOGICAL EFFECTIVITY (BE) TESTS IN AGRICULTURAL CROPS ACCORDING WITH THE Official Mexican Standard NOM-032-FITO-1995

| COMMON NAME OF THE CROP | SCIENTIFIC NAME OF THE CROP | SCIENTIFIC NAME OF THE PATHOGEN | COMMON NAME OF THE DISEASE AND/OR PATHOGEN |
|---|---|---|---|
| | commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with a 91% of control and caused no negative phytotoxic effects on the crop. | | |
| Papaya | *Carica papaya* | *PRSV* | Papaya Virus |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with a 92% of control and caused no negative phytotoxic effects on the crop. | | |
| Melon<br>Watermelon<br>Zucchini<br>Cucumber | *Cucumis melo*<br>*Citrullus lanatus*<br>*Cucurbita pepo*<br>*Cucumis sativus* | *CYSDV* | Yellow Stunting Virus |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with a 91% of control and caused no negative phytotoxic effects on the crop. | | |
| Tomato | *Solanum Lycopersicum* | *TBSV* | Tomato stunt viroid |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period | | |

-continued

| BIOLOGICAL EFFECTIVITY (BE) TESTS IN AGRICULTURAL CROPS ACCORDING WITH THE Official Mexican Standard NOM-032-FITO-1995 | | | |
|---|---|---|---|
| COMMON NAME OF THE CROP | SCIENTIFIC NAME OF THE CROP | SCIENTIFIC NAME OF THE PATHOGEN | COMMON NAME OF THE DISEASE AND/OR PATHOGEN |
| | Application was done on foliage with a motorized knapsack sprayer calibrated according to the doses used. | | |
| Results | The optimal nanosystem dose was 1.0 liter per hectare with a 90% of control and caused no negative phytotoxic effects on the crop. | | |
| Chili | *Capsicum annuum* | *PHYVV* | Pepper yellow vein |
| Dose per hectare | 0.75, 1.0 and 1.25 L in 200 L of water | Concentration of the active agent (nanosystem) | 10% |
| Test method | Statistic design: complete random blocks with five treatments, three of the nanosystem that is being tested with 0.75, 1.0 and 1.25 L per hectare; commercial control, cooper sulphate 350 g per hectare; and Absolute control with no application. Total applications: 5 at 7-day intervals. BE measurement parameters and phytotoxicity: Townsend and Heuberger Formula; Variance analysis, Turkey's multiple comparison test. Phenological state of the crop: Growing period Application was done on foliage with a motorized knapsack sprayer calibrated according to the doses used. | | |
| Results | The optimal nanosystem dose was 1.0 liter per hectare with a 91% of control and caused no negative phytotoxic effects on the crop. | | |

| BIOLOGICAL EFFECTIVITY (BE) TESTS IN ANIMAL SPECIES (LIVESTOCK, ZOOTECHNICS, VETERINARY) | | | |
|---|---|---|---|
| COMMON NAME | SCIENTIFIC NAME | SCIENTIFIC NAME OF THE PATHOGEN | COMMON NAME OF THE DISEASE AND/OR PATHOGEN |
| Hen | *Gallus gallus domesticus* | *Aspergillus fumigatu.* | Aspergillosis |
| Dose per animal | 500 ml in 1000 L of water | Concentration of the active agent (nanosystem) | 10% |
| Fungi (*fungi* spp.) | | | |
| Test method | Statistical design: 3 groups of fowl were given the nanosystem as follows: 2 preventive treatments with dilutions 0.5 ml:1000 ml (TP-1) and 1 ml:1000 ml (TP-2), and 1 control group: Control 1 (C1) with no application of nanosystem; with conventional farm management. 100 fowls were included per group. An exclusive corral was assigned in which three 3 × 3 m-squares were prepared. Total applications: 2 (weekly). BE measurement parameters and cytotoxicity: Applications were made in the drinking water. Physical inspections of vomit were made on the animal's feed until this adverse effect was contained. Lessons in proventriculus and mortality were registered. | | |
| Results | The optimal nanosystem dose was 1.0 liter in 1000 L with a control of 95% and caused no negative cytotoxic effects in this species. | | |

-continued

BIOLOGICAL EFFECTIVITY (BE) TESTS IN ANIMAL SPECIES (LIVESTOCK, ZOOTECHNICS, VETERINARY)

| COMMON NAME | SCIENTIFIC NAME | SCIENTIFIC NAME OF THE PATHOGEN | COMMON NAME OF THE DISEASE AND/OR PATHOGEN |
|---|---|---|---|
| | | **Bacteria** | |
| Bees | *Apis mellifera* | *Melissococcus plutonius* | European foulbrood |
| Dose per application (colony) | 5.0 and 10 mL in 1000 mL | Concentration of the active agent (nanosystem) | 10% |
| Test method | Statistical design: 3 groups of which 2 groups of colonies were given the nanosystem as follows: 2 curative treatments with dilutions 5 ml:1000 ml (TP-1) and 10 mi:1000 ml (TP-2), and 1 colony as a control group: Control 1 (C1) with no application of nanosystem; with conventional management schedule of tetracycline complex. 4 colonies were included per group. Total applications: 2 (weekly). BE measurement parameters and cytotoxicity: Applications were made as fine spray (fog effect). Physical checks of dead organisms were made. Daily measurements were made for two weeks. | | |
| Results | Both of the doses were statistically equivalent with a control of 98% and caused no negative cytotoxic effects in this species. | | |
| Cattle | *Bos Taurus/indicus* | Syndrome: *Arcanobacterium pyogenes* *Fusobacterium n.* *Bacteroides* spp. *Escherichia coli* | Metritis |
| Dose per application (intrauterine) | 10 mL in 1000 mL | Concentration of the active agent (nanosystem) | 10% |
| Test method | Statistic design: Five groups as follows: 4 cow groups were given the nanosystem with curative treatment with dilutions 1 ml, 2.5 ml, 5 ml, 7.5 ml:1000 ml, 1 control group of cows with application of commercial antibiotics (Neomycin) and conventional managing schedule. 4 cows per group. Total applications: 3 (weekly) BE measurement parameters and cytotoxicity: Application was made by intrauterine infiltration with syringe. Physical inspection was made and swab samples were taken for ELISA test in petri dishes in lab. Daily measurements were made for two weeks. | | |
| Results | The optimal control dose was 10 mL. Diluted in 990 mL of distilled water with a 98% of control and caused no negative cytotoxic effects in this species. All cows treated excluding those of the control group, showed these results within 21 days after starting the applications. | | |
| Bovines<br>Ovines<br>Caprine | *Bos Taurus/indicus*<br>*Ovis aries*<br>*Capra aegagrus hircus* | *Mycobacterium tuberculosis* | Tuberculosis |
| Dose per application (intravenous, jugular vein) | 20 mL not diluted | Concentration of the active agent (nanosystem) | 10% |
| Test method | Statistic design: Five groups as follows: 4 cow groups were given the nanosystem with curative treatment with a single 20 ml dose, 1 control group of cows with application of commercial antibiotics (Streptomycin) and conventional managing schedule. 15 cows per group. Total applications: 2 (initial and after 20 days) BE measurement parameters and cytotoxicity: Application was made by intravenous injection in the jugular vein. Physical inspection was made and blood samples were taken before starting the application, and after 30 days for PCR laboratory tests. Positive diagnosis of *M. tuberculosis* in the first test and negative result after 30 days. | | |
| Results | The optimal control dose was 20 mL with a 92% of control and caused no negative cytotoxic effects in this species. | | |
| Bovines<br>Ovines<br>Goats | *Bos Taurus/indicus*<br>*Ovis aries*<br>*Capra aegagrus hircus* | *Brucella abortus* | Brucellosis |
| Dose per application (intravenous, jugular vein) | 20 mL not diluted | Concentration of the active agent (nanosystem) | 10% |
| Test method | Statistic design: Five groups as follows: 4 cow groups were given the nanosystem with curative treatment with a single 20 ml dose, 1 control group of cows with application of commercial antibiotics (Streptomycin) and | | |

-continued

BIOLOGICAL EFFECTIVITY (BE) TESTS IN ANIMAL SPECIES (LIVESTOCK, ZOOTECHNICS, VETERINARY)

| COMMON NAME | SCIENTIFIC NAME | SCIENTIFIC NAME OF THE PATHOGEN | COMMON NAME OF THE DISEASE AND/OR PATHOGEN |
|---|---|---|---|
| | conventional managing schedule. 15 cows per group. Total applications: 2 (initial and after 20 days) BE measurement parameters and cytotoxicity: Application was made by intravenous injection in the jugular vein. Physical inspection was made and blood samples were taken before starting the application, and after 30 days for PCR laboratory tests. Positive diagnosis of *B. abortus* in the first test and negative result after 30 days. | | |
| Results | The optimal control dose was 20 mL with a 92% of control and caused no negative cytotoxic effects in these species. | | |
| Fowl | *Gallus gallus domesticus* | *Escherichia coli* | Avian diarrhea |
| Dose per application | 5.0 and 10 mL in 1000 mL | Concentration of the active agent (nanosystem) | 10% |
| Test method | Statistical design: 3 groups of which 2 groups of fowl were given the nanosystem as follows: 2 curative treatments with dilutions 5 ml:1000 ml (TP-1) and 10 ml:1000 ml (TP-2), and 1 fowl group as a control group: Control 1 (C1) with no application of nanosystem; with conventional management schedule of Amoxycillin complex. 4 animals were included per group. Total applications: 2 (weekly). BE measurement parameters and cytotoxicity: Applications were made by oral route. Physical check of dead organisms was made. Daily measurements were made for two weeks. | | |
| Results | Both of the doses were statistically equivalent with a control of 93.5% and caused no negative cytotoxic effects in this species. | | |

BIOLOGICAL EFFECTIVITY (BE) TESTS IN AQUATIC SPECIES

| COMMON NAME | SCIENTIFIC NAME | SCIENTIFIC NAME OF THE PATHOGEN | COMMON NAME OF THE DISEASE AND/OR PATHOGEN |
|---|---|---|---|
| | | Bacterial control | |
| Tilapia | *Oreochromis niloticus* | *Pseudomonas* sp. *i* | Pseudomonasis |
| Dose per application | 200 mL in 1000 L | Concentration of the active agent (nanosystem) | 8% |
| Test method | Statistical design: 3 groups of which 2 groups of tilapia in bucket of water with a capacity of 1,000 L received the nanosystem, with 1 healing treatment with dilution 200 ml:1000 lt and 1 group of control tilapia (C1) without application of nanosystem, with the conventional management schedule. Each group with 500 organisms each. Total applications: 2 (15 days). BE measurement parameters and cytotoxicity: The administration was directly carried out in dissolution of the container with physical review of the effect of dead organisms. Daily measurements were made for two weeks. | | |
| Results | Both of the doses were statistically equivalent with a control of 89.5% and caused no negative cytotoxic effects in this species. | | |
| Neon tetra | *Paracheridon innesi* | *Pleistophora hyphessobryconis* | Neon disease |
| Dose per application | 200 mL in 1000 L | Concentration of the active agent (nanosystem) | 8% |
| Test method | Statistical design: 3 groups of which 2 groups of neon tetra in bucket of water with a capacity of 1,000 L received the nanosystem, with 1 healing treatment with dilution 200 ml:1000 lt and 1 group of control Neon tetra (C1) without application of nanosystem, with the conventional management schedule. Each group with 500 organisms each. Total applications: 2 (15 days). BE measurement parameters and cytotoxicity: The administration was directly carried out in dissolution of the container with physical review of the effect of dead organisms. Daily measurements were made for two weeks. | | |

-continued

| BIOLOGICAL EFFECTIVITY (BE) TESTS IN AQUATIC SPECIES | | | |
|---|---|---|---|
| COMMON NAME | SCIENTIFIC NAME | SCIENTIFIC NAME OF THE PATHOGEN | COMMON NAME OF THE DISEASE AND/OR PATHOGEN |
| Results | Both of the doses were statistically equivalent with a control of 89.5% and caused no negative cytotoxic effects in this species. | | |
| | Virus | | |
| White shrimp | *Panaeus vannamei* | White spot syndrome virus (WSSV) | White Spot Syndrome |
| Dose per application | 200 ml in 1000 L | Concentration of the active agent (nanosystem) | 8% |
| Test method | Statistical design: 3 groups of which 2 groups of white shrimp in bucket of water with a capacity of 1,000 L received the nanosystem, with 1 healing treatment with dilution 200 ml:1000 L and 1 group of control white shrimp (C1) without application of nanosystem, with the conventional management schedule. Each group with 4000 organisms each.<br>Total applications: 2 (15 days).<br>BE measurement parameters and cytotoxicity: The administration was directly carried out in dissolution of the container with physical review of the effect of dead organisms. Daily measurements were made for two weeks. | | |
| Results | Both of the doses were statistically equivalent with a control of 83.5% and caused no negative cytotoxic effects in this species. | | |
| Fowl | *Gallus gallus domesticus* | AIBV (avian coronavirus) | Avian infectious bronchitis, Massachusetts strain |
| Dose per application | 5.0 and 10 mL in 1000 mL | Concentration of the active agent (nanosystem) | 10% |
| Test method | Statistical design: 3 groups of which 2 groups of fowl were given the nanosystem as follows: 2 treatments with dilutions 5 ml:1000 ml (TP-1) and 10 ml:1000 ml (TP-2), and 1 fowl group as a control group: Control 1 (C1) with no application of nanosystem; contact time, 15 minutes.<br>Total applications: 1 during the test (7 days).<br>BE measurement parameters and cytotoxicity: The application was made by fine spraying (fog effect). Physical check of dead organisms was made. Daily measurements were made for one week. | | |
| Results | Both of the doses were statistically equivalent; in treated groups no embryonic mortality or characteristic lesions were found.<br>A 100% of viral INACTIVATION was obtained and caused no negative cytotoxic effects in this species. | | |
| Bees | *Apis mellifera* | BQCV | Black queen cell |
| Dose per application (colony) | 5.0 and 10 mL in 1000 mL | Concentration of the active agent (nanosystem) | 10% |
| Test method | Statistical design: 3 groups of which 2 groups of colonies were given the nanosystem as follows: 2 curative treatments with dilutions 5 ml:1000 ml (TP-1) and 10:1000 (TP-2), and 1 colony as a control group: Control 1 (C1) with no application of nanosystem; with conventional management schedule of tetracycline complex. 4 colonies were included per group.<br>Total applications: 2 (weekly).<br>BE measurement parameters and cytotoxicity: Applications were made as fine spraying (fog effect). Physical check of dead organisms was made. Daily measurements were made for two weeks. | | |
| Results | Both of the doses were statistically equivalent with a control of 99% and caused no negative cytotoxic effects in this species. | | |
| Fowl | *Gallus gallus domesticus* | VENC | Newcastle Disease virus |
| Dose per application | 5.0 and 10 mL in 1000 mL | Concentration of the active agent (nanosystem) | 10% |
| Test method | Statistical design: 3 groups of inoculum in chicken embryo: where 2 groups were given the nanosystem, as follows: 2 treatments with dilutions 5 ml:1000 ml (TP-1) and 10 ml:1000 ml (TP-2), and 1 fowl group as a control group: Control 1 (C1) with no application of nanosystem; contact time, 15 minutes.<br>Total applications: 1 during the test (7 days).<br>BE measurement parameters and cytotoxicity: The application was made by fine spraying (fog effect). Physical check of dead organisms was made. Daily measurements were made for one week. | | |

-continued

BIOLOGICAL EFFECTIVITY (BE) TESTS IN AQUATIC SPECIES

| COMMON NAME | SCIENTIFIC NAME | SCIENTIFIC NAME OF THE PATHOGEN | COMMON NAME OF THE DISEASE AND/OR PATHOGEN |
|---|---|---|---|
| Results | Both of the doses were statistically equivalent; in treated groups no embryonic mortality or characteristic lesions were found. A 100% of viral INACTIVATION was obtained and caused no negative cytotoxic effects in this species. | | |
| Fowl | *Gallus gallus domesticus* | VIA | Avian influenza |
| Dose per application | 5.0 and 10 mL in 1000 mL | Concentration of the active agent (nanosystem) | 10% |
| Test method | Statistical design: 3 groups of inoculum in chicken embryo: where 2 groups were given the nanosystem, as follows: 2 treatments with dilutions 5 ml:1000 ml (TP-1) and 10 ml:1000 ml (TP-2), and 1 fowl group as a control group: Control 1 (C1) with no application of nanosystem; contact time, 15 minutes. Total applications: 1 during the test (7 days). BE measurement parameters and cytotoxicity: The application was made by fine spraying (fog effect). Physical check of dead organisms was made. Daily measurements were made for one week. | | |
| Results | Both of the doses were statistically equivalent; in treated groups no embryonic mortality or characteristic lesions were found. A 100% of viral INACTIVATION was obtained and caused no negative cytotoxic effects in this species. | | |
| Equines | *Equus caballus* | BPV | Papilloma/sarcoma |
| Dose per application | 100 mL in 1000 mL | Concentration of the active agent (nanosystem) | 10% |
| Test method (topical dermal) | Statistical design: Cases: 2 horses received the nanosystem at a dilution of 100 ml:1000 ml by topical application for 14 days. BE measurement parameters and cytotoxicity: The application was made by fine spraying (fog effect). Physical inspection of reduction of the tumor or critical mass. Daily measurements were made for up to one month after treatment starting. | | |
| Results | Evolution of total cicatrization. The tumor did not grow again as before when surgically extracted and after six months a new tumoral mass appeared. A 100% of viral INACTIVATION was obtained and caused no negative cytotoxic effects in this species. | | |
| Canines | *Canis lupus familiaris* | VCPV-2 | Parvovirus |
| Dose per application | 100 mL in 1000 mL | Concentration of the active agent (nanosystem) | 10% |
| Test method (oral route) | Statistical design: Cases: 13 dogs (non vaccinated puppies not older than 90 days) received the nanosystem. The first dose was undiluted (3 mL-syringe shot with no water). After that, the nanosystem was administered in the drinking water at a dilution of 10 ml:1000 ml for 5 days until recovery was evident. BE measurement parameters and cytotoxicity: The application was made by oral syringe shot and in drinking water. Physical inspection of reduction of symptoms. Daily measurements were made for up to 15 days after treatment starting. | | |
| Results | Evolution of symptoms with a 100% of viral INACTIVATION, and caused no negative cytotoxic effects in this species. | | |
| In Vitro/In Vivo Swine | *Sus scrofa domesticus* | PRRSV | Porcine reproductive and respiratory syndrome |
| Dose per application | 0.005%. 0.01% and 0.015% | Concentration of the active agent (nanosystem) | 10% |
| Test method | Statistical design: Lab-tek chambers were inoculated with a lung cell line which was infected according to the protocol. Three factors were considered to carry out the test: 1. Active agent concentration 2. Virus concentration 3. Incubation time First, the virus/active agent mixture was made at the three different concentrations of each, virus and activ eagent: 0.005%, 0.01% and 0.015% of active with a virus concentration of 106 DICT 50%/mL; these same active concentrations with virus concentrations of 105, and 104. Exposition time: 10 and 15 minutes. Immediately after this time, cells were inoculated and incubated at 37° C. for 1 h; then, the inoculum was removed and maintaining culture medium added. Each test was made in triplicate. Plates were fixed at 24, 48, and 72 hours for a Direct Immunofluorescence Test. | | |

-continued

BIOLOGICAL EFFECTIVITY (BE) TESTS IN AQUATIC SPECIES

| COMMON NAME | SCIENTIFIC NAME | SCIENTIFIC NAME OF THE PATHOGEN | COMMON NAME OF THE DISEASE AND/OR PATHOGEN |
|---|---|---|---|
| Results | The nanosystem was able to inactivate PRRSV at the indicated concentrations in an exposition time of 15 minutes at the maximal test concentration studied of one million ($1 \times 10^6$) viral particles per milliliter, causing a 100% of viral INACTIVATION and caused no negative cytotoxic effects in this species. | | |
| In Vitro/In Vivo Swine | *Sus scrofa domesticus* | H3N2 H1N1 | Porcine influenza |
| Dose per application | 1:2500, 1:5000, and 1:7500 mL | Concentration of the active agent (nanosystem) | 10% |
| Test method | Statistical design: Challenge with two virus strains: Influenza Type A H3N2 and H1N1 at a concentration of 1:256 HAU/50 μL and then inoculated in MDCK cells to evaluate viral replication in the presence of the active agent that is being tested. Three dilutions were made: 1:2500 mL, 1:5000 mL, and 1:7500 mL. The nanosystem-virus mixture was left in contact during 15 minutes so that the effect on viruses could take place; then, 6-well plates with MDCK cells were inoculated with the different concentrations of nanosystem-virus, three serial passages were carried out, and after each passage a hemagglutination test was made. After the third passage, cells were harvested and a PCR test was carried out to confirm the diagnosis, | | |
| Results | The nanosystem was able to inactivate the two strains of porcine influenza virus type A, H3N2 and H1N1 at the concentrations 1:5000 mL, and 1:7500 ~~2500~~ mL after the third passage, causing a 100% of viral INACTIVATION and no negative cytotoxic effects. | | |

From the above described, unless stated otherwise, that all numbers expressing ingredient quantities, reaction conditions, etc., used in this application and claims should be understood that constitute approximate quantities; therefore, they may vary depending on the desirable properties wanted to be obtained with the instant invention.

Furthermore, it is clear that other embodiments would be evident to a skilled person from the specification and practice of the invention described herein. Therefore, it is expected that the specification and examples herein are considered as illustrative only.

BIBLIOGRAPHY

1. Katz, L.; Baltz, R. H. Natural product discovery: Past, present, and future. *J. Ind. Microblol. Biotechno* 2016, 43, 155-176.
2. Das, S.; Singh, V. K.; Dwivedy, A. K., Chaudhari, A. K.; Upadhyay, N.; Singh, P.; Sharma, S.; Dubey, N. K. Encapsulation in chitosan-based nanomatrix as an efficient green technology to boost the antimicrobial, antioxidant and in situ efficacy of *Coriandrum sativum* essential oil. Int. *J. Biol. Macromol.* 2019, 133, 294-305.
3. Shetta, A.; Kegere, J.; Mamdouh, W. Comparative study of encapsulated peppermint and green tea essential oils in chitosan nanoparticles: Encapsulation, thermal stability, in-vitro release, antioxidant and antibacterial activities. *Int. J. Biol. Macromol.* 2019, 126, 731-742,
4. Feyzioglu, G. C.; Tornuk, F. Development of chitosan nanoparticles loaded with summer savory (Satureja-hortensis L.) essential oil for antimicrobial and antioxidant delivery applications, *LWT* 2016, 70, 104-110.
5. Ntohogian, S.; Gavriliadou, V.; Christodoulou, E.; Nanaki, S.; Lykidou, S.; Naidis, P.; Mischopoulou, L.; Barmpalexis, P.; Nikolaidis, N.; Bikiaris, D. N. Chitosan nanoparticles with encapsulated natural and uf-purified annatto and saffron for the preparation of uv protective cosmetic emulsions. *Molecules* 2018, 23, 2107.
6. Hussein, A. M.; Kamil, M. M.; Lotfy, S. N.; Mahmoud, K. F.; Mehaya, F. M.; Mohammad, A. A. Influence of nano-encapsulation on chemical composition, antioxidant activity and thermal stability of rosemary essential oil. *Am. J. Food Technol.* 2017, 12, 170-177.
7. Nedovic, V.; Kalusevic, A.; Manojlovic, V.; Levic, S.; Bugarski, B. An overview of encapsulation technologies for food applications. *Procedia Food Sci.* 2011, 1, 1806-1815.
8. Munin, A.; Edwards-Lévy, F. Encapsulation of Natural Polyphenolic Compounds; a Review. *Pharmaceutics* 2011, 3, 793-829.
9. Casanova, F.; Santos, L. Encapsulation of cosmetic active ingredients for topical application—A review. *J. Microencapsul.* 2016, 33, 1-17.
10. Jafari, S. M. An overview of nanoencapsulation techniques and their classification. In *Nanoencapsulation Technologies for the Food and Nutraceutical Industries*; Academic Press: Cambridge, MA, USA; 2017; pp. 1-34.
11. Suganya, V.; Anuradha, V. Microencapsulation and Nanoencapsulation: A Review. *Int. J. Pharm. Clin Res.* 2017, 9.
12. Jyothi, N. V.; Prasanna, P. M.; Sakarkar, S. N.; Prabha, K. S.; Ramaiah, P. S.; Srawan, G. Y. Microencapsulation techniques, factors influencing encapsulation efficiency. *J. Microencapsul.* 2010, 27, 187-197.
13. Gibbs, B. F.; Kermasha; S.; Inteaz, A.; Catherine, N.; Mulligan, B. Encapsulation in the food industry: A review. *Int. J. Food Sci. Nutr.* 1999, 50, 213-224.
14. Assadpour, E.; Jafari, S. M. Advances in Spray-Drying Encapsulation of Food Bioactive Ingredients: From Microcapsules to Nanocapsules, *Annu. Rev. Food Sci. Technol.* 2019, 10, 103-131.
15. Lohith Kumar, D. H.; Sarkar, P. Encapsulation of bioactive compounds using nanoemulsions. *Environ. Chem. Lett.* 2018, 16, 59-70.

16, Bakry, A. M.; Abbas, S.; Ali, B.; Majeed, H.; Abouelwafa, M. Y.; Mousa, A.; Liang, L. Microencapsulation of Oils: A Comprehensive Review of Benefits, Techniques, and Applications. *Compr. Rev. Food Sol. Food Saf.* 2016, 15, 143-182.

17. Coates, A. R.; Halls, G.; Hu, Y. Novel classes of antibiotics or more of the same. *Br. J. Pharmacol.* 2011 163, 184-194.

18. Bassetti, M.; Merelli, M.; Temperoni, C.; Astilean, A. New antibiotics for bad bugs: Where are we. *Ann. Clin. Microbial. Antimicrob.* 2013, 12, 22.

19. Leucuta, S. E. Nanotechnology for delivery of drugs and biomedical applications. *Curr. Clin. Pharmacol.* 2010, 5, 257-280.

20. Mahapatro, A.; Singh, D. K. Biodegradable nanoparticles are excellent vehicle for site directed in-vivo delivery of drugs and vaccines. *J. Nanobiotechnol.* 2011, 9, 55.

21. Gunn, J.; Zhang, M. Polyblend nanofibers for biomedical applications: Perspectives and challenges. *Trends Biotechnol.* 2010, 28, 189-197.

22. Vasita, R.; Katti, D. S. Nanofibers and their applications in tissue engineering. *Int. J. Nanomed.* 2006, 1, 15-30.

23. Guo, G.; Fu, S.; Zhou, L.; Liang, H.; Fan, M.; Luo, F.; Qian, Z.; Wei, Y. Preparation of curcumin loaded poly (epsilon-caprolactone)-polyethylene glycol)-poly(epsilon-caprolactone) nanofibers and their in vitro antitumor activity against glioma 91 cells. *Nanoscale.* 2011, 3, 3825-3832.

24. Yoo, J. J.; Kim, C.; Chung, C. W.; Jeong, Y. I.; Kang, D. H. 5-aminolevulinic acid-incorporated poly(vinyl alcohol) nanofiber-coated metal stent for application in photodynamic therapy. *Int. J. Nanomed.* 2012, 7, 1997-2005

25. J. Moma, J. Baloyi, Modified titanium dioxide for photocatalytic applications, Photocatalysts-Applications and Attributes, Intech Open, 2018.

26. M. Landmann, E. W. G. S. Rauls, W. G. Schmidt, The electronic structure and optical response of rutile, anatase and brookite $TiO_2$, J. Phys.: Condens. Matter 24 (19) (2012) 195503.

27. V. Etacheri, C. Di, J. Valentin, D. Bahnemann Schneider, C. S. Pillai, Visible-light activation of $TiO_2$ photocatalysts: advances in theory and experiments, J. Photochem. Photobiol. C 25 (2015) 1-29.

28. W. Xie, R. Li et, O. Xu., Enhanced photocatalytic activity of Si-doped $TiO_2$ under visible light irradiation, Sci. Rep. 8 (1) (2018) 1-10.

29. C. Dette, M. A. Perez-Osorio, C. S. Kley, P. Punke, C. E. Patrick, P. Jacobson, K. Kern, $TiO_2$ anatase with a bandgap in the visible region, Nano Lett. 14 (11) (2014) 6533-6538.

30. M. E. Khan, M. M. Khan, B. K. B. K. Min, M. H. Cho, Microbial fuel cell assisted band gap narrowed $TiO_2$ for visible-light-induced photocatalytic activities and power generation, Sci. Rep. 8 (1) (2018) 1-12.

31. A. Fujishima, T. X. Zheng, A. D. Tryk, Surf. Sci. Rep. J. 63 (2008) 515.

32. Y. Umemura, E. Shinohara, A. Koura, T. Nishioka, T. Sasaki, Photocatalytic decomposition of an alkylammonium cation in a Langmuir-Blodgett film of a titania nanosheet, Langmuir 22 (8) (2006) 3870-3877.

33. J. Zheng, H. Yu, X. Li, S. Zhang, Enhanced photocatalytic activity of $TiO_2$ nanostructured thin film with a silver hierarchical configuration, Appl. Surf. Sci. 254 (6) (2008) 1630-1635.

34. T. Irugnanam, Effect of polymers (PEG and PVP) on the sol-gel synthesis of microsized zinc oxide, J. Nanomater. 2013 (2013) 7, Article ID 362175.

35. A. A. Haidry, J. Puskelova, T. Plecenik, P. During, J. Gregus, M. Truchly, A. Plecenik., Characterization and hydrogen gas sensing properties of $TiO_2$ thin films prepared by sol-gel method, Appl. Surf. Sci. 259 (2012) 270-275.

36. M. Kashif, U. Hashim, M. E. Ali, K. L. Foo, S. M. U. Ali, Morphological, structural, and electrical characterization of sol-gel-synthesized ZnO nanorods, J. Nanomater. 2013 (2013) 7, Article ID 478942.

37. P. Sun, H. Liu, H. Yang, Synthesis and characterization of $TiO_2$ thin films coated on a metal substrate, Appl. Surf. Sci. 256 (10) (2010) 3170-3173.

38. W. Guo, C. Xu, G. Zhu, C. Pan, C. Lin, Z. L. Wang, Optical fiber/$TiO_2$-nanowirearrays hybrid structures with tubular counter electrode for dye-sensitized solar cell, Nano Energy 1 (1) (2012) 176-182.

39. R. Palomino-Merino, O. Portillo-Moreno, L. A. Chaltel-Lima, R. Gutierrez Perez, M. de Icaza-Herrera, V. M. Castano, Chemical bath deposition of PbS: $Hg^{2+}$ nanocrystalline thin films, J. Nanomater. 2013 (2013) 6.

40. Z. S. Khalifa, H. Lin, S. Ismat Shah, Structural and electrochromic properties of $TiO_2$ thin films prepared by metallorganic chemical vapor deposition, Solid Films 518 (19) (2010) 5457-5462.

41. C. Jiang, M. Y. Leung, W. L. Koh, Y. Li, Influences of deposition and postannealing temperatures on properties of $TiO_2$ blocking layer prepared by spray pyrolysis for solid-state dye-sensitized solar cells, Solid Films 519 (22) (2011) 7850-7854.

42. B. Barrocas, O. C. Monteiro, M. E. Melo Jorge, Photocatalytic activity and reusability study of nanocrystalline $TiO_2$ films prepared by sputtering technique, Appl. Surf. Sci. 264 (2013) 111-116.

43. M. Maaza, 35 Natural Dyes for Photonics Applications, 2014

44. P. Yuvasree, K. Nithya, N. Neelakandeswari, Biosynthesis of silver nanoparticles from *Aloe vera* plant extract and its antimicrobial activity against multidrug-resistant pathogens, in: International Conference on Advanced Nanomaterials & Emerging Engineering Technologies, IEEE, 2013, pp. 84-86.

45. Makarov, W.; Love, A J.; Sinitsyna, O V; Makarova, S S.; Yaminsky, I V.; Taliansky, M E, Kalinina, N O. Green" nanotechnologies: synthesis of metal nanoparticles using plants. Acta. Naturae, 6(1): 35-44. (2014). 306 J. M. Abisharani et al./Materials Today: Proceedings 14 (2019) 302-307

46. Hoffmann M R, Martin S T, Choi W Y, Bahnemann D W. Environmental applications of semiconductor photocatalysis. Chem Rev; 95: 69-96. 1995.

47. Fujishima A, Rao T N, Truk D A. Titanium dioxide photocatalysis. J Photochem Photobiol C: Photochern, 1: 1-21. 2000.

48. Aadarsh Mishra, Analysis Of Titanium Dioxide And Its Application In Industry, Int. J. Mech. Eng. & Rob. Res., 3(3), 7 pages, 2014.

49. Gelis C, Girard S, Mavon A, Delverdier M, Pailous N, Vicendo P. Assessment of the skin photo protective capacities of an organomineral broad spectrum sunblock on two ex vivo skin models. Photodermatol Photoimmunol Photomed; 19: 242-253. 2003.

50. Trouiller B, Reliene R, Westbrook A, Solaimani P, Schiestl R H. Titanium dioxide nanoparticles induce DNA damage and genetic instability in vivo in mice. Cancer Res; 69: 8784-8789. 2009.

51. Carlos Martin Shiva Ramayoni. Estudio de la actividad antimicrobiana de extractos naturales y ácidos orgánicos.

Posible alternativa a los antibióticos promotores de crecimiento. Department de Sanitat i d'Anatomia Animals. Facultat de Veterinarària. Universitat Autònoma de Barcelona

The invention claimed is:

1. A nanosystem comprising (a) a mesoporous nanocomposite, wherein the nanocomposite comprises $(TiO_2)$-MO, wherein M is a transition metal which is not considered toxic for an environment, mammals, and plants, and (b) one or more natural extracts deposited and/or adsorbed onto the surface and within pores of said mesoporous nanocomposite, wherein the nanocomposite has a surface area from 74 $m^2/g$ to 200 $m^2/g$, wherein the concentration of natural extracts is from about 10 mg to 100 mg, and wherein the morphology of the nanosystem is nanospheres of a core-shell structure, wherein the natural extracts are encapsulated by the nanocomposite and gradually released from the nanocomposite.

2. The nanosystem of claim 1, wherein the $(TiO_2)$-MO is $TiO_2$—ZnO.

3. The nanosystem of claim 1, wherein the natural extracts are encapsulated by terpenoid, sesquiterpenoid, diterpenoid, sesterterpenoid, triterpenoid, carotenoid, resinoids, complementary acids and polysaccharides, vitamins or other organic compounds.

4. The nanosystem of claim 1, wherein the natural extracts are essential oils and/or fruit bioactive compounds alone or combined with two or more thereof, obtained from flowers selected from *Arnica montana, Lavandula* sp., *Chamaemelum nobile, Tanacetum cinerariifolium, Thymus* sp., *Syzygium aromaticum, Rosa* sp., *Geranium* sp., *Jasminum* sp., *Cananga odorata, Citrus aurantium* var. *Amara, Lavandula* sp., *Plumeria rubra, Borago officinalis, Erodium cicutarium, Gnaphalium* sp., *Heterotheca inuloides* Cass., *Lepidium virginicum* L., *Matricaria recutita* L., *Mirablis jalapa* L., and *Tagetes lucida* Cav; roots selected from *Angelica archangelica, Asarum europaeum, Crocus sativus, Acorus calamus, Curcuma longa, Alpinia galanga, Zingiber officinale, Santalum album, Sassafras albidium, Valeriana officinalis, Chrysopogon zizanioides, Glycyrrhiza glabra* L., *Cinnamoum verum*, and *Agave* spp.; leaves selected from *Artemisia absinthium, Ocimum basilicum, Agathosma betulina, Aloysia citrodora, Eucalyptus* sp., *Mentha spicata, Cymbopogon, citratus, Origanum majorana, Mentha* sp., *Pogostemon cablin, Chenopodium ambrosioides, Salvia rosmarinus, Salvia officinalis, Melissa officinalis, Cinnamomum verum, Moringa oleifera, Organum vulgare* L., *Plantago major* L., and *Taraxacum officinale* W.; a fruit pericarp selected from *Citrus bergamia, Citrus* x *limon, Citrus reticulata, Citrus* x *sinensis, Citrus* x *aurantium, Citrus* x *latifolia, Citrus* x *paradisi, Agave* spp., *Juglans regia* L., and *Punica granatum* L.; seeds selected from *Pimpinella anisum, Elettaria cardamomum, Morinda citrifolia, Anethum graveolens, Foeniculum vulgare, Cuminum cyminum, Salvia officinalis, Salvia hispanica, Capsicum annauum, Rosa rubiginosa, Vitis vinifera, Cocos nucifera, Argemone mexicana* L., and *Avena sativa*; fruits selected from *Carum carvi, Coriandrum sativum, Laurus nobilis, Myristica fragans, Petroselinum crispum, Piper nigrum*, and *Morinda citrifolia*; stems or branches selected from *Cinnamomum verum, Cedrus* sp., *Pinus* sp., *Eucalyptus* sp., *Abies* sp., *Cupressus* sp., *Agave* spp., and *Aloe barbadenses* Mil.

5. The nanosystem of claim 4, wherein the essential oils are selected from anethol, anisaldehyde, bomeol, carvacrol, D-carvone, I-carvone citral citronellal, geraniol, D-limonene, linalool, menthol, pinene, terpineol, thymol, vanillin, alfa-ocimene, borneol, Y-cadinene, caryophyllene, citronellal, p-cymene, aldehyde decyilic, farnesol, farnesal, fenchone, geraniol, geranyl acetate, germacrene, limonene, methyl heptenone, myrcene, nerolinol, nerol, ocimene, terpinene, α-pinene, β-phellandrene, β-myrcene, γ-terpinolene, octanal, decanal, octanol, iso-citronellene, camphene, trans-p-menthane, p-mentha-1(7),8-diene, dihydromyrcenol, trans-dihydrocarvone, beta-pinene, estragole, longifolene, and L-alpha-terpineol, alone or combined with two or more thereof.

6. The nanosystem of claim 1, which further optionally comprises terpenoid, sesquiterpenoid, diterpenoid, sesterterpenoid, triterpenoid, carotenoid, and ricinoid compounds; complementary acids selected from lactic acid, palmitic acid, formic acid, citric acid, oxalic acid, ureic acid, ascorbic acid, malic acid, acetic acid, alone or combined with two or more thereof, complementary polysaccharides selected from glucose, ribose, deoxyribose, mannose, fructose, galactose, glyceraldehyde, erythrose, fucose, alone or combined with two or more thereof, vitamins selected from vitamin A, thiamin B1, riboflavin B2, niacinamide B3, pyridoxin B6, cobalamin B12, vitamin D, vitamin C, vitamin E, folic acid (vitamin B9), pantothenic acid (vitamin B5), alone or combined with two or more thereof, and other organic compounds selected from bioflavonoids, glycerin, pectins, and amino acids, alone or combined with two or more thereof.

7. A method of treating a material comprising applying the nanosystem of claim 1 to the material.

8. A method of killing a worm comprising applying the nanosystem of claim 1 to the worm.

9. A method of killing fungus comprising applying the nanosystem of claim 1 to the fungus.

10. A method of killing bacteria comprising applying the nanosystem of claim 1 to the bacteria.

11. A method of disinfecting a material comprising applying the nanosystem of claim 1 to the material.

12. A method of sanitizing a material comprising applying the nanosystem of claim 1 to the material.

13. A method of killing a virus comprising applying the nanosystem of claim 1 to the virus.

* * * * *